United States Patent
Aitken et al.

(10) Patent No.: US 11,724,471 B2
(45) Date of Patent: Aug. 15, 2023

(54) METHODS FOR THE MANUFACTURE OF PHOTOABSORBING CONTACT LENSES AND PHOTOABSORBING CONTACT LENSES PRODUCED THEREBY

(71) Applicant: Johnson & Johnson Vision Care, Inc., Jacksonville, FL (US)

(72) Inventors: Brian Aitken, Edison, NJ (US); Jeffrey D. Caltrider, Neptune Beach, FL (US); Leilani K. Sonoda, Atlantic Beach, FL (US); Robert MacDonald Smith, Jacksonville, FL (US); Donnie J. Duis, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 542 days.

(21) Appl. No.: 16/805,931

(22) Filed: Mar. 2, 2020

(65) Prior Publication Data

US 2020/0307130 A1  Oct. 1, 2020

Related U.S. Application Data

(60) Provisional application No. 62/825,050, filed on Mar. 28, 2019.

(51) Int. Cl.
*G02C 7/04* (2006.01)
*B29D 11/00* (2006.01)
(Continued)

(52) U.S. Cl.
CPC .. *B29D 11/00038* (2013.01); *B29D 11/00634* (2013.01); *G02C 7/028* (2013.01);
(Continued)

(58) Field of Classification Search
CPC . G02C 7/10; G02C 7/102; G02C 7/04; G02C 7/108; G02C 7/104; G02C 7/028;
(Continued)

(56) References Cited

U.S. PATENT DOCUMENTS 3,034,403 A  5/1962 Neefe
3,808,178 A  4/1974 Gaylord
(Continued)

FOREIGN PATENT DOCUMENTS

CA  1099546 A1  4/1981
CN  1732078     2/2006
(Continued)

OTHER PUBLICATIONS

International Preliminary Report on Patentability, dated Sep. 28, 2021, for PCT Int'l Appln. No. PCT/IB2020/052307.
(Continued)

*Primary Examiner* — William R Alexander
(74) *Attorney, Agent, or Firm* — Raef M. Shaltout

(57) ABSTRACT

Provided is a method for manufacturing photoabsorbing contact lenses and photoabsorbing contact lenses produced thereby. The method comprises: (a) providing a mold assembly comprised of a base curve and a front curve, the base curve and the front curve defining and enclosing a cavity therebetween, the cavity containing a reactive mixture, wherein the reactive mixture comprises at least one polymerizable monomer, a photoinitiator which absorbs at an activating wavelength, and a photoabsorbing compound which displays absorption at the activating wavelength; and (b) curing the reactive mixture to form the photoabsorbing contact lens by exposing the reactive mixture to radiation that includes the activating wavelength, wherein the radiation is directed at both the base curve and the front curve of the mold assembly, and wherein the radiation's radiant
(Continued)

Example of Overlapping Absorption Spectra of the Photo-initiator and Photo-absorbing Monomer with LED lamp emission bandwidth energy at the base curve is greater than the radiation's radiant energy at the front curve.

8 Claims, 7 Drawing Sheets

(51) Int. Cl.
  *H05B 45/12* (2020.01)
  *G02C 7/02* (2006.01)
  *G02C 7/10* (2006.01)
  *B29K 105/00* (2006.01)
  *B29K 33/00* (2006.01)
  *B29K 83/00* (2006.01)

(52) U.S. Cl.
  CPC ............... *G02C 7/04* (2013.01); *G02C 7/10* (2013.01); *H05B 45/12* (2020.01); *B29K 2033/12* (2013.01); *B29K 2033/26* (2013.01); *B29K 2083/00* (2013.01); *B29K 2105/0002* (2013.01); *B29K 2995/0018* (2013.01)

(58) Field of Classification Search
  CPC ........ B29D 11/00038; B29D 11/00153; B29D 11/0048; B29D 11/00634; B29D 11/00653; B29D 11/00009; B29D 11/00; B29K 2083/00; B29K 2105/0002; B29K 2995/0018; B29K 2033/12; B29K 2033/26; H05B 45/12; H05B 45/10
  USPC .......................................................... 351/44
  See application file for complete search history.

(56) References Cited

U.S. PATENT DOCUMENTS

| | | |
|---|---|---|
| 4,073,577 A | 2/1978 | Hofer |
| 4,120,570 A | 10/1978 | Gaylord |
| 4,136,250 A | 1/1979 | Mueller et al. |
| 4,139,513 A | 2/1979 | Tanaka et al. |
| 4,139,692 A | 2/1979 | Tanaka et al. |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,301,012 A | 11/1981 | Puckett |
| 4,327,203 A | 4/1982 | Deichert et al. |
| 4,330,383 A | 5/1982 | Ellis et al. |
| 4,341,889 A | 7/1982 | Deichert et al. |
| 4,343,927 A | 8/1982 | Chang |
| 4,355,147 A | 10/1982 | Deichert et al. |
| 4,390,676 A | 6/1983 | Loshaek et al. |
| 4,436,887 A | 3/1984 | Chromecek et al. |
| 4,450,264 A | 5/1984 | Cho |
| 4,463,149 A | 7/1984 | Ellis |
| 4,486,577 A | 12/1984 | Mueller et al. |
| 4,495,313 A | 1/1985 | Larsen |
| 4,525,563 A | 6/1985 | Shibata et al. |
| 4,543,398 A | 9/1985 | Bany et al. |
| 4,576,453 A | 3/1986 | Borowsky |
| 4,605,712 A | 8/1986 | Mueller et al. |
| 4,659,782 A | 4/1987 | Spinelli |
| 4,659,783 A | 4/1987 | Spinelli |
| 4,661,575 A | 4/1987 | Tom |
| 4,669,834 A | 6/1987 | Richter |
| 4,680,336 A | 7/1987 | Larsen |
| 4,681,412 A | 7/1987 | Lemelson |
| 4,703,097 A | 10/1987 | Wingler et al. |
| 4,707,236 A | 11/1987 | Borowsky |
| 4,711,943 A | 12/1987 | Harvey, III |
| 4,725,277 A | 2/1988 | Bissonette |
| 4,731,079 A | 3/1988 | Stoy |
| 4,837,289 A | 6/1989 | Mueller et al. |
| 4,863,464 A | 9/1989 | Dusek |
| 4,871,785 A | 10/1989 | Froix |
| 4,872,876 A | 10/1989 | Smith |
| 4,889,664 A | 12/1989 | Kindt-Larsen et al. |
| 4,891,046 A | 1/1990 | Wittmann et al. |
| 4,952,046 A | 8/1990 | Stephens et al. |
| 4,954,586 A | 9/1990 | Toyoshima et al. |
| 4,954,587 A | 9/1990 | Mueller |
| 4,973,493 A | 11/1990 | Guire |
| 4,997,897 A | 3/1991 | Melpolder |
| 5,006,622 A | 4/1991 | Kunzler et al. |
| 5,010,141 A | 4/1991 | Mueller |
| 5,034,461 A | 7/1991 | Lai et al. |
| 5,039,459 A | 8/1991 | Kindt-Larsen et al. |
| 5,057,578 A | 10/1991 | Spinelli |
| 5,070,215 A | 12/1991 | Bambury et al. |
| 5,115,056 A | 5/1992 | Mueller et al. |
| 5,135,297 A | 8/1992 | Valint, Jr. |
| 5,235,358 A | 8/1993 | Mutzhas et al. |
| 5,236,969 A | 8/1993 | Kunzler et al. |
| 5,244,981 A | 9/1993 | Seidner et al. |
| 5,270,418 A | 12/1993 | Kunzler et al. |
| 5,275,838 A | 1/1994 | Merrill |
| 5,298,533 A | 3/1994 | Nandu et al. |
| 5,314,960 A | 5/1994 | Spinelli et al. |
| 5,331,067 A | 7/1994 | Seidner et al. |
| 5,336,797 A | 8/1994 | McGee et al. |
| 5,346,946 A | 9/1994 | Yokoyama et al. |
| 5,358,995 A | 10/1994 | Lai et al. |
| 5,371,147 A | 12/1994 | Spinelli et al. |
| 5,387,632 A | 2/1995 | Lai et al. |
| 5,433,898 A | 7/1995 | Thakrar et al. |
| 5,451,617 A | 9/1995 | Lai et al. |
| 5,486,579 A | 1/1996 | Lai et al. |
| 5,617,154 A | 4/1997 | Hoffman |
| 5,645,767 A | 7/1997 | Van Gemert |
| 5,658,376 A | 8/1997 | Noguchi et al. |
| 5,710,302 A | 1/1998 | Kunzler et al. |
| 5,714,557 A | 2/1998 | Kunzler et al. |
| 5,760,100 A | 6/1998 | Nicolson et al. |
| 5,776,999 A | 7/1998 | Nicolson et al. |
| 5,779,943 A | 7/1998 | Enns et al. |
| 5,789,461 A | 8/1998 | Nicolson et al. |
| 5,807,944 A | 9/1998 | Hirt et al. |
| 5,824,719 A | 10/1998 | Kunzler et al. |
| 5,846,457 A | 12/1998 | Hoffman |
| 5,849,811 A | 12/1998 | Nicolson et al. |
| 5,908,906 A | 6/1999 | Kunzler et al. |
| 5,919,880 A | 7/1999 | Imafuku et al. |
| 5,936,016 A | 8/1999 | Lareginie et al. |
| 5,944,853 A | 8/1999 | Molock et al. |
| 5,958,440 A | 9/1999 | Burrell et al. |
| 5,962,548 A | 10/1999 | Vanderlaan et al. |
| 5,965,631 A | 10/1999 | Nicolson et al. |
| 5,973,039 A | 10/1999 | Florent et al. |
| 5,981,615 A | 11/1999 | Meijs et al. |
| 5,981,675 A | 11/1999 | Valint, Jr. et al. |
| 5,998,498 A | 12/1999 | Vanderlaan et al. |
| 6,017,121 A | 1/2000 | Chateau et al. |
| 6,020,445 A | 2/2000 | Vanderlaan et al. |
| 6,039,913 A | 3/2000 | Hirt et al. |
| 6,042,756 A | 3/2000 | Muller et al. |
| 6,087,415 A | 7/2000 | Vanderlaan et al. |
| 6,113,814 A | 9/2000 | Gemert et al. |
| 6,174,465 B1 | 1/2001 | Buazza et al. |
| 6,193,369 B1 | 2/2001 | Valint, Jr. et al. |
| 6,200,626 B1 | 3/2001 | Grobe, III et al. |
| 6,213,604 B1 | 4/2001 | Valint, Jr. et al. |
| 6,224,210 B1 | 5/2001 | Chateau et al. |
| 6,305,801 B1 | 10/2001 | Kerns, Jr. et al. |
| 6,337,040 B1 | 1/2002 | Thakrar et al. |
| 6,367,929 B1 | 4/2002 | Maiden et al. |
| 6,420,453 B1 | 7/2002 | Bowers et al. |
| 6,423,761 B1 | 7/2002 | Bowers et al. |
| 6,429,294 B1 | 8/2002 | Masuda et al. |
| 6,767,979 B1 | 7/2004 | Muir et al. |

(56) References Cited

U.S. PATENT DOCUMENTS

| | | |
|---|---|---|
| 6,811,257 B1 | 11/2004 | Lehat |
| 6,822,016 B2 | 11/2004 | McCabe et al. |
| 6,864,299 B1 | 3/2005 | Komuro et al. |
| 6,867,245 B2 | 3/2005 | Iwata et al. |
| 6,905,641 B2 | 6/2005 | Platt et al. |
| 6,943,203 B2 | 9/2005 | Vanderlaan et al. |
| 7,053,169 B2 | 5/2006 | Buhler |
| 7,247,692 B2 | 7/2007 | Laredo |
| 7,249,848 B2 | 7/2007 | Laredo et al. |
| 7,261,844 B2 | 8/2007 | Tanikawa et al. |
| 7,354,959 B2 | 4/2008 | Tucker et al. |
| 7,364,291 B2 | 4/2008 | Haywood et al. |
| 7,553,880 B2 | 6/2009 | Nicolson et al. |
| 7,556,750 B2 | 7/2009 | Xiao et al. |
| 7,560,056 B2 | 7/2009 | Van Gemert et al. |
| 7,666,921 B2 | 2/2010 | McCabe et al. |
| 7,717,556 B1 | 5/2010 | Walker |
| 7,785,092 B2 | 8/2010 | Rogers |
| 7,786,185 B2 | 8/2010 | Rathore et al. |
| 7,931,369 B2 | 4/2011 | Harris |
| 7,934,830 B2 | 5/2011 | Blackwell et al. |
| 7,956,131 B2 | 6/2011 | Arnold et al. |
| 8,022,158 B2 | 9/2011 | Rathore et al. |
| 8,026,326 B2 | 9/2011 | Benz et al. |
| 8,079,704 B2 | 12/2011 | Sanger |
| 8,138,290 B2 | 3/2012 | Blackwell et al. |
| 8,273,802 B2 | 9/2012 | Laredo et al. |
| 8,360,574 B2 | 1/2013 | Ishak et al. |
| 8,389,597 B2 | 3/2013 | Blackwell et al. |
| 8,399,538 B2 | 3/2013 | Steffen et al. |
| 8,450,387 B2 | 5/2013 | McCabe et al. |
| 8,470,906 B2 | 6/2013 | Rathore et al. |
| 8,487,058 B2 | 7/2013 | Liu et al. |
| 8,507,577 B2 | 8/2013 | Zanini et al. |
| 8,618,323 B2 | 12/2013 | Benz et al. |
| 8,637,621 B2 | 1/2014 | Iwata et al. |
| 8,697,770 B2 | 4/2014 | Duis et al. |
| 8,703,891 B2 | 4/2014 | Broad |
| 8,877,103 B2 | 11/2014 | Alvarez-Carrigan et al. |
| 8,937,110 B2 | 1/2015 | Alli et al. |
| 8,937,111 B2 | 1/2015 | Alli et al. |
| 8,940,812 B2 | 1/2015 | Reboul et al. |
| 9,056,878 B2 | 6/2015 | Fujisawa et al. |
| 9,057,821 B2 | 6/2015 | Broad et al. |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,193,119 B2 | 11/2015 | Newman |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 9,904,074 B2 | 2/2018 | Duis et al. |
| 9,927,635 B2 | 3/2018 | Ishak et al. |
| 9,975,301 B2 | 5/2018 | Duis |
| 10,254,443 B2 | 4/2019 | Mccabe et al. |
| 10,310,293 B2 | 6/2019 | Duis et al. |
| 10,322,993 B2 | 6/2019 | Chang et al. |
| 10,328,645 B2 | 6/2019 | Liu et al. |
| 10,571,718 B2 | 2/2020 | Widman |
| 10,894,374 B2 | 1/2021 | Duis et al. |
| 10,901,319 B2 | 1/2021 | Widman et al. |
| 10,906,258 B2 | 2/2021 | Holland et al. |
| 10,961,341 B2 | 3/2021 | Aitken et al. |
| 11,021,558 B2 | 6/2021 | Aitken et al. |
| 11,034,789 B2 | 6/2021 | Aitken et al. |
| 11,364,696 B2 | 6/2022 | Widman et al. |
| 11,391,965 B2 | 7/2022 | Duis et al. |
| 2002/0080451 A1 | 6/2002 | Hughes et al. |
| 2002/0080464 A1 | 6/2002 | Bruns |
| 2003/0103188 A1 | 6/2003 | Zeltzer |
| 2003/0142267 A1 | 7/2003 | Gemert et al. |
| 2004/0135159 A1 | 7/2004 | Siegel |
| 2004/0158028 A1 | 8/2004 | Buhler |
| 2004/0186241 A1 | 9/2004 | Gemert |
| 2005/0128433 A1 | 6/2005 | Jahnke |
| 2005/0218536 A1 | 10/2005 | Quinn et al. |
| 2005/0221105 A1 | 10/2005 | Quinn et al. |
| 2005/0222295 A1* | 10/2005 | Siegel ............... B41J 3/413 522/8 |
| 2005/0237484 A1 | 10/2005 | Ocampo |
| 2005/0243272 A1 | 11/2005 | Mainster et al. |
| 2005/0258408 A1 | 11/2005 | Molock et al. |
| 2006/0050232 A1 | 3/2006 | Dukes et al. |
| 2006/0055882 A1 | 3/2006 | Phelan |
| 2006/0226401 A1 | 10/2006 | Xiao et al. |
| 2006/0227287 A1 | 10/2006 | Molock et al. |
| 2007/0035050 A1 | 2/2007 | Rogers |
| 2007/0065633 A1 | 3/2007 | Mori et al. |
| 2008/0002147 A1 | 1/2008 | Haywood et al. |
| 2008/0125512 A1 | 5/2008 | Van Gemert et al. |
| 2008/0186448 A1 | 8/2008 | Ishak et al. |
| 2008/0221674 A1 | 9/2008 | Blum et al. |
| 2008/0235047 A1 | 9/2008 | Broderick et al. |
| 2009/0051059 A1 | 2/2009 | Widman et al. |
| 2009/0072206 A1 | 3/2009 | Kim et al. |
| 2009/0238948 A1* | 9/2009 | Muller ............ B29D 11/00903 427/2.1 |
| 2009/0244479 A1 | 10/2009 | Zanini et al. |
| 2010/0010123 A1 | 1/2010 | Fujie et al. |
| 2010/0048847 A1 | 2/2010 | Broad |
| 2010/0057202 A1 | 3/2010 | Bogaert |
| 2010/0149620 A1 | 6/2010 | Knowles et al. |
| 2010/0321632 A1 | 12/2010 | Sanger |
| 2011/0051223 A1 | 3/2011 | Knowles et al. |
| 2011/0248415 A1 | 10/2011 | Alvarez-Carrigan et al. |
| 2011/0249234 A1 | 10/2011 | Duis et al. |
| 2011/0249235 A1 | 10/2011 | Duis et al. |
| 2012/0023869 A1* | 2/2012 | Samuel ................. G02B 1/043 53/425 |
| 2012/0075577 A1 | 3/2012 | Ishak et al. |
| 2012/0175796 A1 | 7/2012 | Wippermann et al. |
| 2015/0115484 A1 | 4/2015 | Duis et al. |
| 2016/0176134 A1* | 6/2016 | Liu ................. B29D 11/00125 425/412 |
| 2016/0313571 A1 | 10/2016 | Alli et al. |
| 2017/0184878 A1 | 6/2017 | Duis et al. |
| 2018/0011223 A1* | 1/2018 | Alli ....................... C08G 77/52 |
| 2018/0037690 A1* | 2/2018 | Aitken ............... C08F 290/068 |
| 2018/0229457 A1 | 8/2018 | Duis et al. |
| 2019/0225726 A1 | 7/2019 | Desousa et al. |
| 2019/0250428 A1 | 8/2019 | Duis et al. |
| 2020/0110282 A1 | 4/2020 | Powell et al. |
| 2021/0003867 A1 | 1/2021 | Takenaka et al. |
| 2021/0055575 A1 | 2/2021 | Park et al. |
| 2021/0101352 A1 | 4/2021 | Duis et al. |
| 2021/0179766 A1 | 6/2021 | Aitken et al. |
| 2021/0208424 A1 | 7/2021 | Duis et al. |
| 2021/0261712 A1 | 8/2021 | Aitken et al. |
| 2021/0277170 A1 | 9/2021 | Aitken et al. |
| 2021/0347929 A1 | 11/2021 | Cheng et al. |
| 2021/0371731 A1 | 12/2021 | Jing et al. |
| 2022/0134692 A1 | 5/2022 | Chang et al. |
| 2022/0137433 A1 | 5/2022 | Chang et al. |
| 2022/0317475 A1 | 10/2022 | Duis et al. |

FOREIGN PATENT DOCUMENTS

| | | |
|---|---|---|
| CN | 1956686 A | 5/2007 |
| CN | 101189536 | 5/2008 |
| CN | 101583325 A | 11/2009 |
| CN | 101687373 A | 3/2010 |
| CN | 1914028 A | 10/2010 |
| DE | 10252838 A1 | 6/2004 |
| EP | 0277639 A2 | 8/1988 |
| EP | 0799864 B1 | 6/2000 |
| EP | 788872 B1 | 6/2002 |
| EP | 0763754 B1 | 1/2003 |
| EP | 1437392 A1 | 7/2004 |
| EP | 1337395 B1 | 8/2006 |
| EP | 1054269 B1 | 5/2008 |

(56) References Cited

FOREIGN PATENT DOCUMENTS

| | | |
|---|---|---|
| EP | 2098192 A1 | 9/2009 |
| EP | 2645157 A2 | 10/2013 |
| ES | 1039419 U | 12/1998 |
| FR | 2664991 A1 | 1/1992 |
| GB | 2305256 A | 4/1997 |
| JP | 63163321 | 7/1988 |
| JP | S63264719 A | 11/1988 |
| JP | 3107121 | 5/1991 |
| JP | 5070770 | 3/1993 |
| JP | 06258604 A | 9/1994 |
| JP | 8507094 | 7/1996 |
| JP | 9136902 | 5/1997 |
| JP | 9272814 A | 10/1997 |
| JP | 09327845 A | 12/1997 |
| JP | 10503764 | 4/1998 |
| JP | 10513125 | 12/1998 |
| JP | 2004504474 | 2/2004 |
| JP | 2004535598 | 11/2004 |
| JP | 2005511338 A | 4/2005 |
| JP | 2006503338 | 1/2006 |
| JP | 2007537492 A | 12/2007 |
| JP | 2008511026 | 4/2008 |
| JP | 2008536179 | 9/2008 |
| JP | 2009094446 A | 4/2009 |
| JP | 2009543137 | 12/2009 |
| JP | 2010511205 | 4/2010 |
| JP | 6902808 B1 | 7/2021 |
| KR | 2009021445 | 3/2009 |
| RU | 584529 A1 | 12/1993 |
| RU | 2629903 C2 | 9/2017 |
| TW | 328116 B | 3/1998 |
| TW | 202138448 A | 10/2021 |
| WO | 1994017110 A1 | 8/1994 |
| WO | 9505621 A1 | 2/1995 |
| WO | 1999027978 A1 | 6/1999 |
| WO | 1999029750 A1 | 6/1999 |
| WO | 2000022459 A1 | 4/2000 |
| WO | 2000022460 A1 | 4/2000 |
| WO | 2000026698 A1 | 5/2000 |
| WO | 2001030866 A1 | 5/2001 |
| WO | 2001040846 A1 | 6/2001 |
| WO | 2001050182 A1 | 7/2001 |
| WO | 200208355 A2 | 1/2002 |
| WO | 2003003073 A1 | 1/2003 |
| WO | 2003011551 A1 | 2/2003 |
| WO | 2003022321 A2 | 3/2003 |
| WO | 2003032084 A2 | 4/2003 |
| WO | 2003089519 A1 | 10/2003 |
| WO | 2004052631 A2 | 6/2004 |
| WO | 2005032791 A1 | 4/2005 |
| WO | 2005058587 A2 | 6/2005 |
| WO | 2006010612 A1 | 2/2006 |
| WO | 2006023664 A1 | 3/2006 |
| WO | 2006110306 A1 | 10/2006 |
| WO | 2007078334 A2 | 7/2007 |
| WO | 2008003012 A2 | 1/2008 |
| WO | 2008061992 A2 | 5/2008 |
| WO | 2008067109 A1 | 6/2008 |
| WO | 2008134694 A1 | 11/2008 |
| WO | 2009099099 A1 | 8/2009 |
| WO | 2010068541 A1 | 6/2010 |
| WO | 2011004611 A1 | 1/2011 |
| WO | 2011130137 A2 | 10/2011 |
| WO | 2011130139 A1 | 10/2011 |
| WO | 2017093835 A1 | 6/2017 |
| WO | 2022100815 A1 | 5/2022 |

OTHER PUBLICATIONS

Anonymous: "Scotopic vision—Wikipedia", Mar. 12, 2010 (Mar. 12, 2010), XP055674255, Retrieved from the Internet: URL:https://en.wikipedia.org/w/index.php? title=Scotopic_vision&oldid=349418365 [retrieved on Mar. 6, 2020].

Abadi, "The spectral transmittance of hydrogel contact lens filters." University of Manchester Institute of Science and Technology. Manchester, UK: University of Manchester, 1989. Print.

Anonymous: PureVision(TM) (balafilcon A) Visibility Tinted Contact Lenses for Continuous Wear, Apr. 27, 2005 (retrieved from the internet on May 3, 2019).

Billmeyer, Jr. et al. Principles of Color Technology. 2nd. New York, NY: John Wiley and Sons, 1981. 47-52. Print.

Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.

Crivello, et al, Photoinitiators for Free Radical Cationic & Anionic Photopolymerisation, 2nd Edition, vol. III, pp. 275-298, John Wiley and Sons, New York, 1998.

Flanagan, et al. "Effect of Wavelength on Discomfort Glare From Monochromatic Sources." UMTRI-89-30; The Universit of Michigan. Ann Arbor, MI: Transportation Research Institute, 1989. Print.

Gribble, et al., Progress in Heterocyclic Chemistry, Elsevier, 2005, pp. 31-38, vol. 17.

International Preliminary Report on Patentability dated Oct. 16, 2012 for PCT/US2011/031878.

International Preliminary Report on Patentability dated Oct. 16, 2012 for PCT/US2011/031879.

International Preliminary Reporton Patentability dated Oct. 26, 2012 for PCT/US2011/031880.

ISO 18369-4:2006: Ophthalmic optics—Contact lenses—Part 4: Physicochemical properties of contact lens materials.

Lira et al, Changes in UV-Visible Transmittance of Silicone-Hydrogel Contact Lenses Induced by Wear, Optometry and Vision Science, 2009, vol. 86, No. 4, pp. 332-339.

PCT international Search Report, dated Aug. 3, 2011, for PCT Int'l Appln. No. PCT/US2011/031880.

PCT International Search Report, dated Jun. 7, 2011, for PCT Int'l Appln. No. PCT/US2011/031879.

PCT International Search Report, dated Nov. 16, 2011, for PCT Int'l. Appln. No. PCT/US2011/031878.

People's Republic China Search report dated Aug. 2, 2016, for Chinese Patent Appln. No. 201510593314.1.

Purslow, et al. "Ocular Surface Temperature." Eye & Contact Lens. 31.3 (2005): 117-123. Print.

Turygin, Applied Optics, Geometric Optics and Evaluation Methods of Optical Schemes, 1965, 131, Chapter V.

Wilkins, et al. "Visual stress, its treatment with spectral filters, and its relationship to visually induced motion sickness." Applied Ergomomics. 41. (2010): 509-515. Print.

Wolffsohn, et al. "Objective clinical performance of 'comfort-enhanced' daily disposable soft contact lenses." Contact Lens & Anterior Eye. 33. (2010): 88-92. Print.

PCT International Search Report, dated Jun. 17, 2020, for PCT Int'l. Appln. No. PCT/IB2020/052307.

* cited by examiner

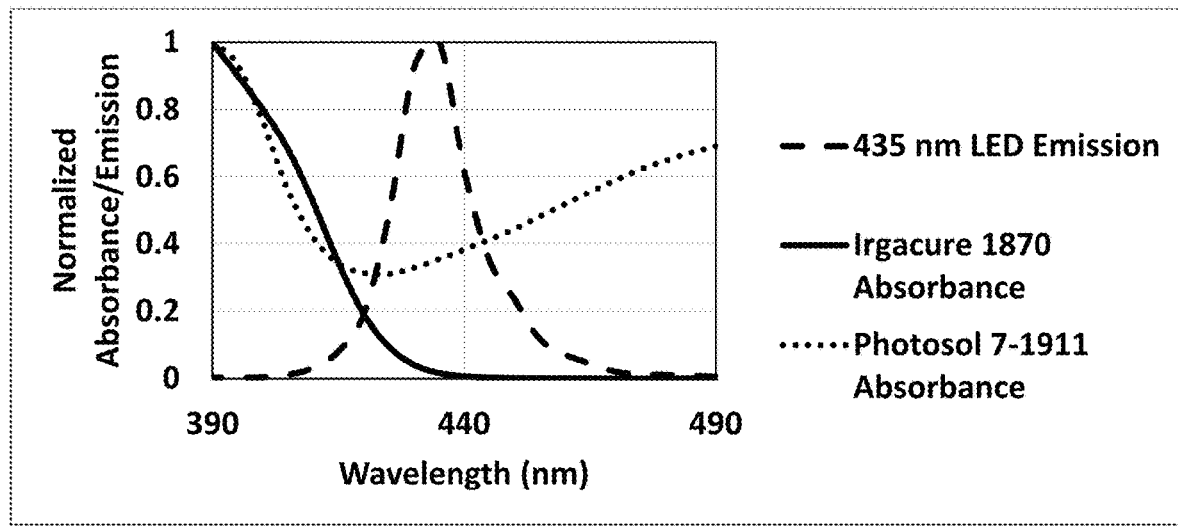
FIG. 1. Example of Overlapping Absorption Spectra of the Photo-initiator and Photo-absorbing Monomer with LED lamp emission bandwidth

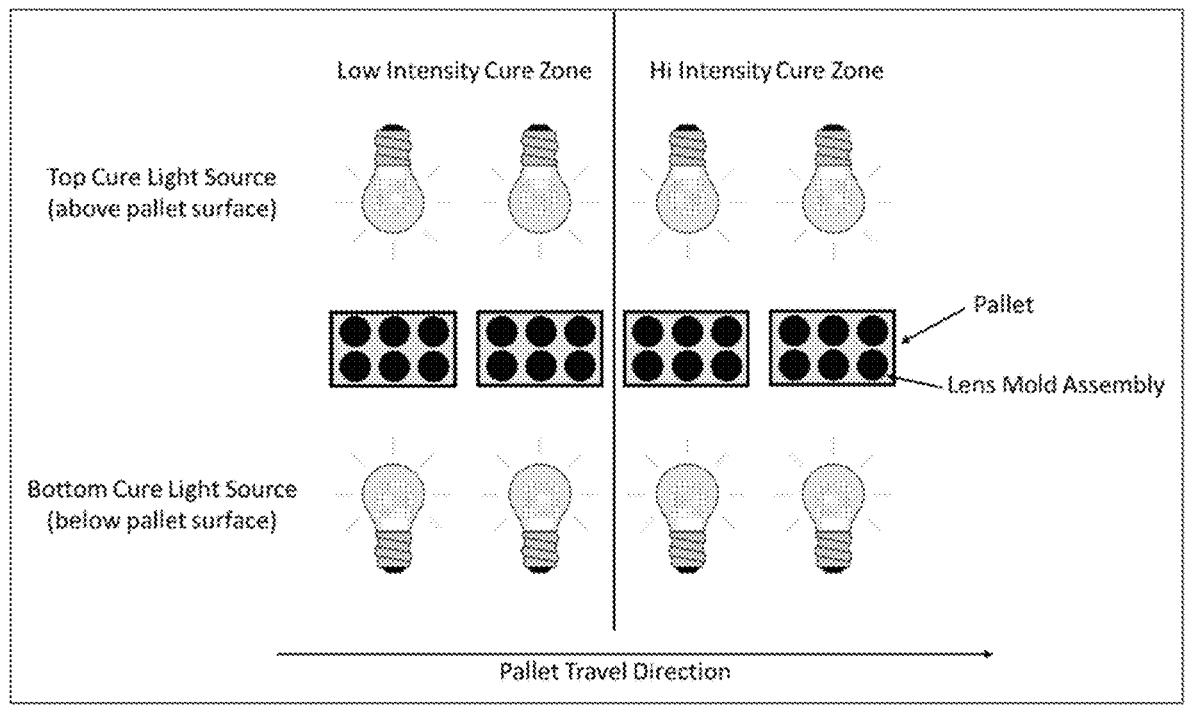
FIG. 2. Schematic diagram of the two-zone curing tunnel

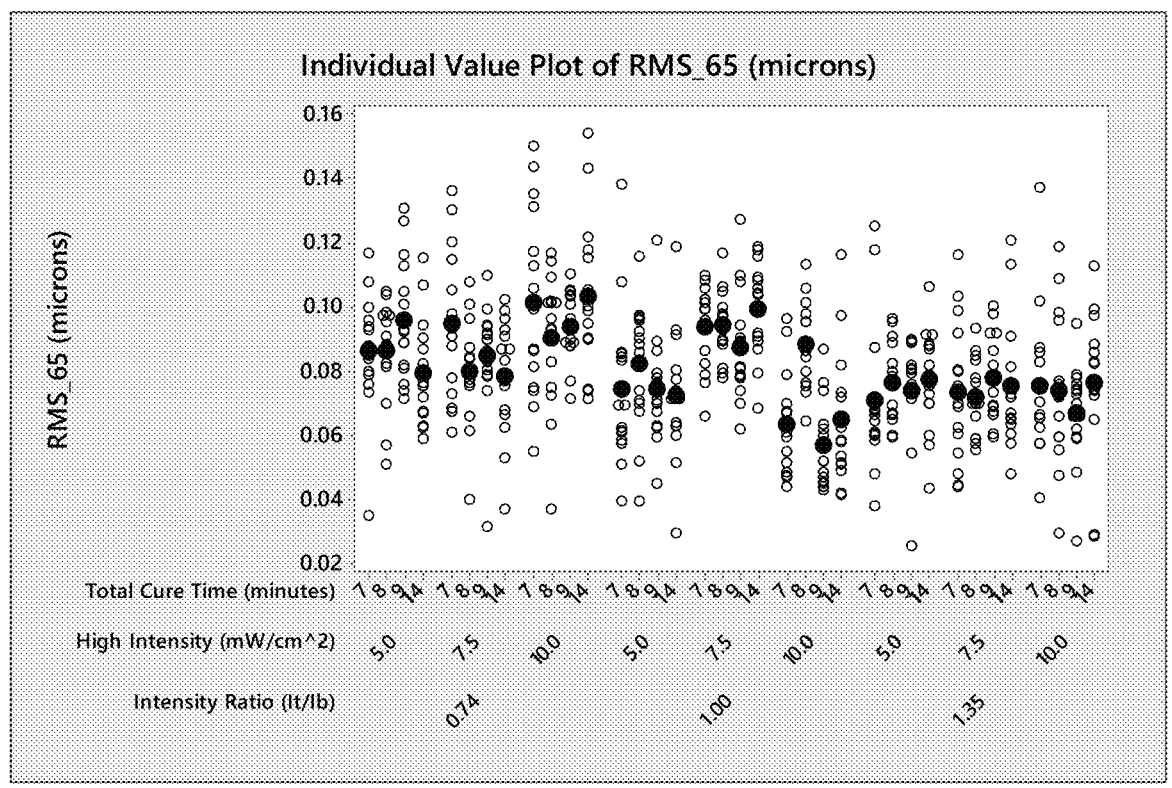
FIG. 3. RMS_65 Data

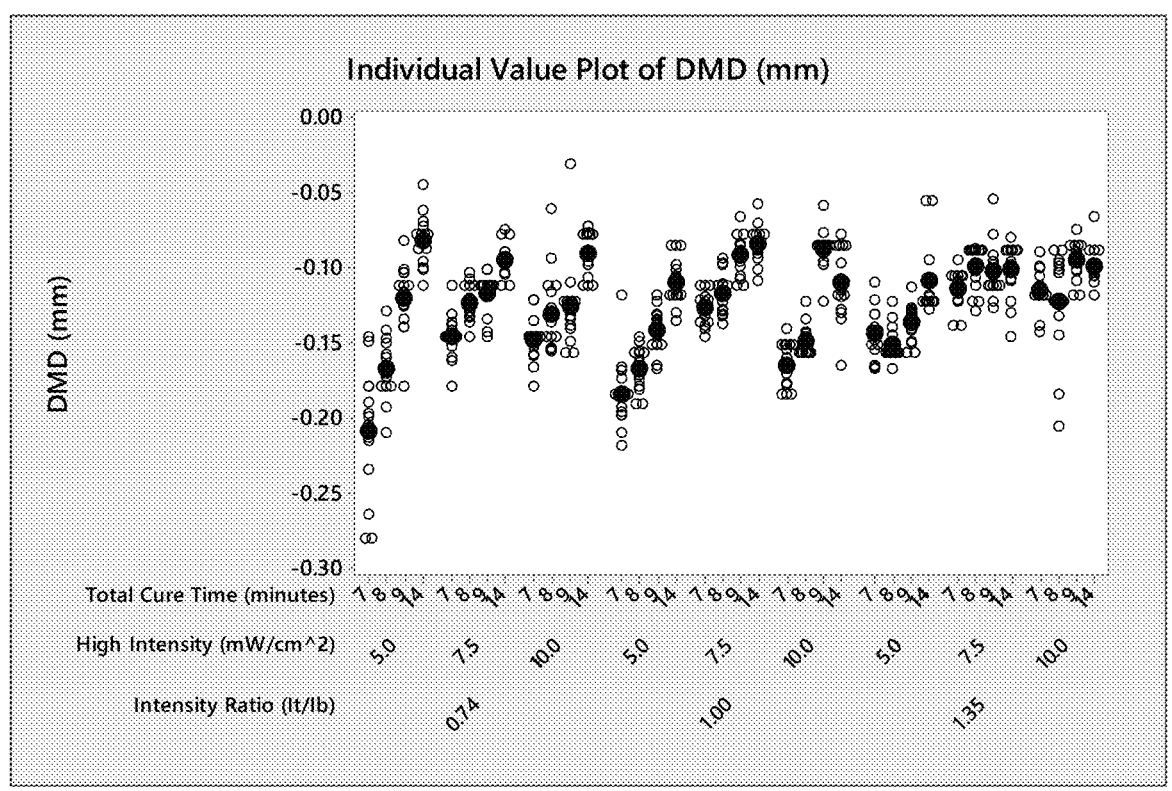
FIG. 4. DMD Data

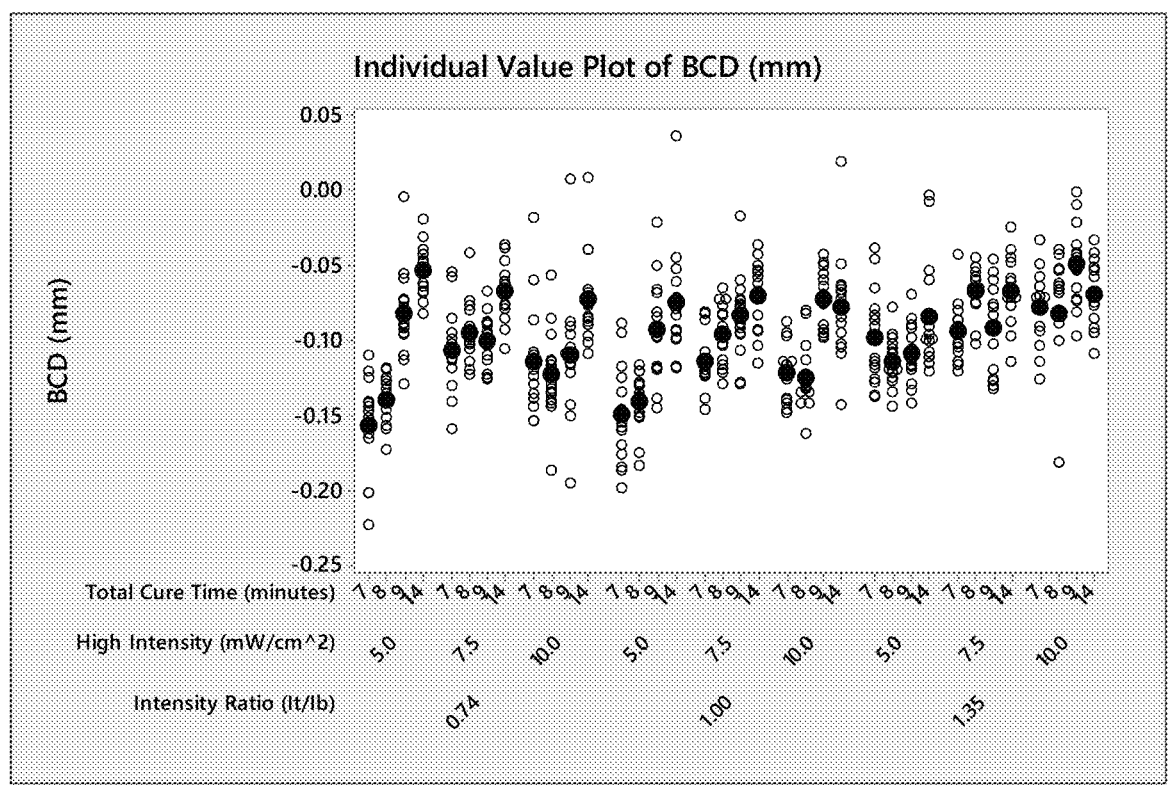
FIG. 5. BCD Data

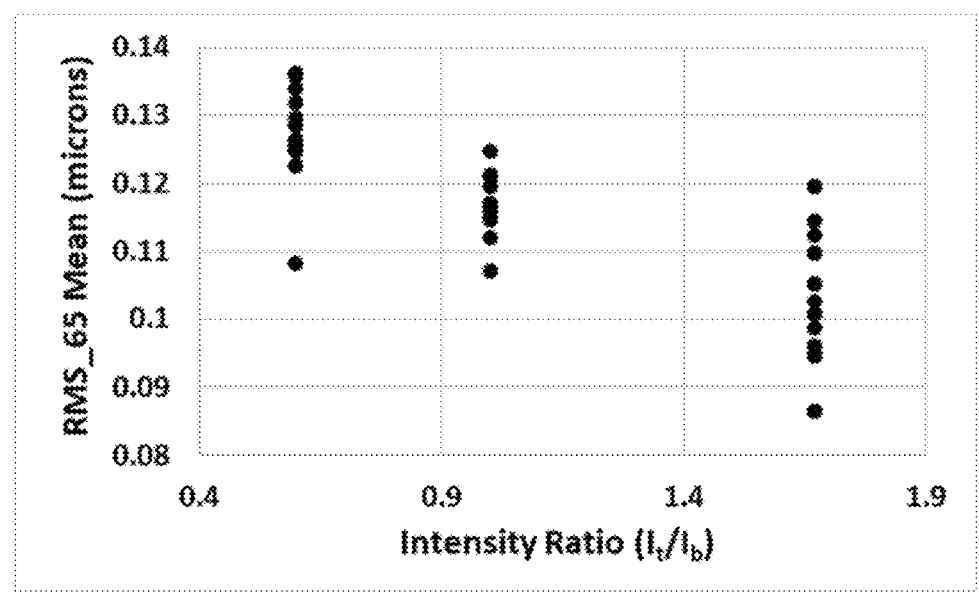
FIG. 6. RMS_65 Mean Data for Examples Where Top and Bottom Panel Wavelengths are 435nm

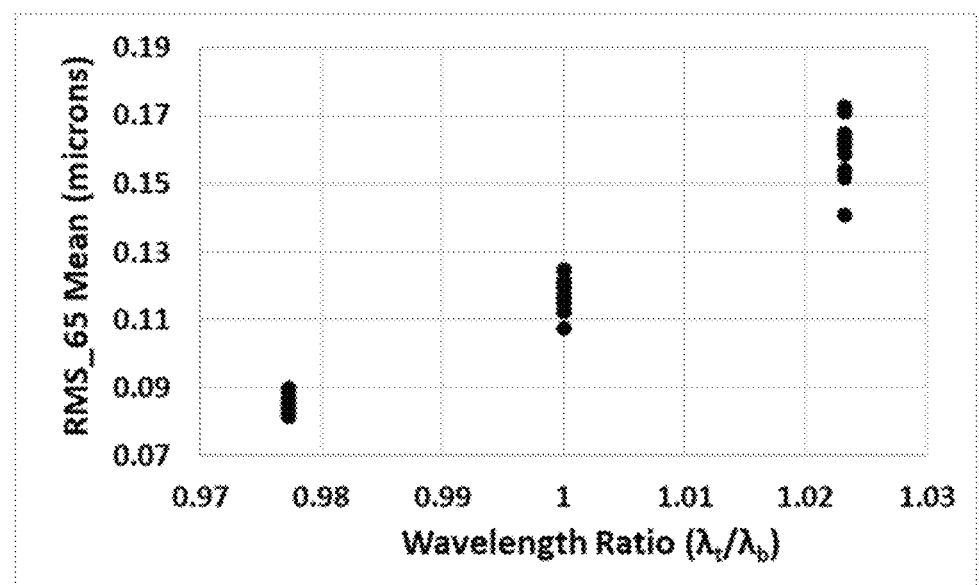
FIG. 7. RMS_65 Mean Data for Examples Where Intensity Ratio is 1

METHODS FOR THE MANUFACTURE OF PHOTOABSORBING CONTACT LENSES AND PHOTOABSORBING CONTACT LENSES PRODUCED THEREBY

RELATED APPLICATIONS

This application claims priority to U.S. Provisional Patent Application Ser. No. 62/825,050, filed Mar. 28, 2019, which is incorporated herein by reference in its entirety.

FIELD OF THE INVENTION

The invention relates to contact lenses and methods for their manufacture. More specifically, the invention related to methods for manufacturing contact lenses that contain a photoabsorbing compound, such as a high energy visible (HEV) light absorbing compound or a photochromic compound.

BACKGROUND OF THE INVENTION

Precision spectral filters absorb specific wavelengths of visible or UV radiation. This allows for the production of optical articles, such as glasses, which can be tailored to block specific wavelengths of light for different uses, including the protection of the cornea, lens and retina from harmful or undesirable radiation wavelengths. For example, various sunglasses have been developed to protect human eyes from strong light, including photochromic glasses, polarized glasses and glasses for specific activities such as shooting and fishing. Photochromic spectacles darken upon exposure to certain wavelengths of light, typically exposure to ultraviolet (UV) light, and brighten when UV light is removed. Often, such photochromic spectacles include a prescription for vision correction.

Adapting certain technology, including photochromic technology, to contact lenses is more difficult than adapting the same technology to spectacles. Additional factors, such an oxygen permeability, comfort and fit of the resulting lens, must be taken into account. The manufacturing process of contact lenses is also more complicated. Typically, contact lenses are formed by irradiating a photoinitiator in the presence of one or more polymerizable materials. In the case of photochromic contact lenses, it is desirable to include the photochromic dye in the reactive mixture containing the photoinitiator and polymerizable materials that, upon polymerization, forms the contact lens. Unfortunately, certain photoabsorbing compounds, including photochromic dyes, may absorb radiation that is otherwise required to activate the photoinitiator, and therefore have the potential to interfere with the polymerization reaction.

Manufacturing methods that allow for the efficient and reproducible incorporation of photoabsorbing compounds into contact lenses would be a significant advance in the field.

SUMMARY OF THE INVENTION

The invention relates to methods for manufacturing photoabsorbing contact lenses and to photoabsorbing contact lenses produced by such methods. It has been discovered that contact lenses containing photoabsorbing compounds may be efficiently and reproducibly prepared by manufacturing methods as described herein. Contact lenses are typically manufactured by polymerizing a reactive monomer mixture within a lens-shaped mold. The polymerization reaction may be initiated by various known techniques, such as UV or visible light initiation or thermal initiation. In typical UV or visible light initiation techniques, the reactive monomer mixture is exposed to the activating radiation from one direction. In the invention, however, the reactive monomer mixture is exposed to the activating radiation from at least two directions. Moreover, the radiant energy of the activating radiation differs between the two directions, referred to herein as differential cure. As a result, the inventive process provides contact lenses, containing a photoabsorbing compound, whose optical parameters have improved in comparison to both single sided cure and non-differential double sided cure, and whose lens properties are less dependent on cure conditions such as time, temperature, and irradiation intensity and wavelength.

In one aspect, therefore, the invention provides a method for manufacturing a photoabsorbing contact lens. The method comprises: (a) providing a mold assembly comprised of a base curve and a front curve, the base curve and the front curve defining and enclosing a cavity therebetween, the cavity containing a reactive mixture, wherein the reactive mixture comprises at least one polymerizable monomer, a photoinitiator which absorbs at an activating wavelength, and a photoabsorbing compound which displays absorption at the activating wavelength; and (b) curing the reactive mixture to form the photoabsorbing contact lens by exposing the reactive mixture to radiation that includes the activating wavelength, wherein the radiation is directed at both the base curve and the front curve of the mold assembly, and wherein the radiation's radiant energy at the base curve is greater than the radiation's radiant energy at the front curve.

In another aspect, the invention provides photoabsorbing contact lenses prepared by the manufacturing methods described herein.

BRIEF DESCRIPTION OF DRAWINGS

FIG. 1 shows overlapping absorption spectra of a photoinitiator and photo-absorbing monomer within the LED lamp emission bandwidth.

FIG. 2 shows a schematic diagram of a two-zone curing tunnel.

FIG. 3 shows a scatter plot of the RMS_65 data.

FIG. 4 shows a scatter plot of the DMD data.

FIG. 5 shows a scatter plot of the BCD data.

FIG. 6 shows a scatter plot of RMS_65 data where top and bottom panel wavelengths are 435 nm.

FIG. 7 shows a scatter plot of RMS_65 data where the intensity ratio of top and bottom panels is 1.

DETAILED DESCRIPTION OF THE INVENTION

It is to be understood that the invention is not limited to the details of construction or process steps set forth in the following description. The invention is capable of other embodiments and of being practiced or being carried out in various ways using the teaching herein.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

The term "(meth)" designates optional methyl substitution. Thus, a term such as "(meth)acrylates" denotes both methacrylates and acrylates.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

A "monomer" is a mono-functional molecule which can undergo chain growth polymerization, and in particular, free radical polymerization, thereby creating a repeating unit in the chemical structure of the target macromolecule. As used in this specification, the term "monomer" encompasses small molecules, as well as larger molecules that are capable of chain growth under free radical polymerization conditions, such as macromers, oligomers, and prepolymers. A "hydrophilic monomer" is a monomer which yields a clear single phase solution when mixed with deionized water at 25° C. at a concentration of 5 weight percent.

A "silicone-containing component" is a molecule, typically a monomer, with at least one silicon-oxygen bond, typically in the form of siloxy groups, siloxane groups, carbosiloxane groups, and mixtures thereof.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

The terms "reactive mixture" and "reactive monomer mixture" refer to the mixture of components (both reactive and non-reactive) which are mixed together and, when subjected to polymerization conditions, form the conventional or silicone hydrogels of the present invention as well as contact lenses made therefrom. The reactive monomer mixture may comprise reactive components such as the monomers, cross-linkers, and initiators, additives such as wetting agents, release agents, polymers, dyes, light absorbing compounds such as UV absorbers, pigments, dyes and photochromic compounds, any of which may be reactive or non-reactive but are capable of being retained within the resulting biomedical device, as well as pharmaceutical and nutraceutical compounds, and any diluents. It will be appreciated that a wide range of additives may be added based upon the contact lens which is made and its intended use. Concentrations of components of the reactive mixture are expressed as weight percentages of all components in the reactive mixture, excluding diluent. When diluents are used, their concentrations are expressed as weight percentages based upon the amount of all components in the reactive mixture and the diluent.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N, N-dimethylacrylamide ("DMA") or vinyl acetate. U.S. Pat. Nos. 4,436,887, 4,495,313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Conventional hydrogels may also be formed from polyvinyl alcohol. Conventional hydrogel lenses may contain a coating, and the coating may be the same or different material from the substrate. Conventional hydrogels may include additives such as polyvinyl pyrrolidone, and comonomers including phosphoryl choline, methacrylic acid and the like. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of suitable families of hydrophilic components that may be present in the reactive mixture include (meth)acrylates, styrenes, vinyl ethers, (meth)acrylamides, N-vinyl lactams, N-vinyl amides, N-vinyl imides, N-vinyl ureas, 0-vinyl carbamates, 0-vinyl carbonates, other hydrophilic vinyl compounds, and mixtures thereof. Silicone-containing components are well known and have been extensively described in the patent literature. For instance, the silicone-containing component may comprise at least one polymerizable group (e.g., a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing), at least one siloxane group, and one or more linking groups (which may be a bond) connecting the polymerizable group(s) to the siloxane group(s). The silicone-containing components may, for instance, contain from 1 to 220 siloxane repeat units. The silicone-containing component may also contain at least one fluorine atom. Silicone hydrogel lenses may contain a coating, and the coating may be the same or different material from the substrate.

Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

The term "radiant energy" as employed in this specification means the energy of the electromagnetic radiation that is used for activating photoinitiators present in the reactive monomer mixture. In the invention, the radiant energy is controlled by the intensity, the wavelength, or both the intensity and the wavelength, of the radiation. The radiant energy is directly proportional to the intensity of the radiation and inversely proportional to the wavelength of the radiation (shorter wavelengths provide greater radiant energy).

As noted above, the invention provides methods for manufacturing photoabsorbing contact lenses, for instance contact lenses that contain a photochromic compound and/or a high energy visible (HEV) light absorbing compound. The contact lenses are made from reactive mixtures that comprise at least one polymerizable monomer, a photoinitiator which absorbs at an activating wavelength, and a photoabsorbing compound which displays absorption at the activating wavelength.

The presence of both a photoinitiator and a photoabsorbing compound having overlapping light absorption properties in the same reactive mixture can make controlled activation of the photoinitiator problematic. Without wishing to be bound to any particular theory, it is believed that the absorption by the light absorbing compound in the same spectral region as the photoinitiator causes the photoabsorbing compound to at least partially "shield" the photoinitiator. Where the photoabsorbing compound is a photochromic compound, this absorption may occur when the photochromic is at least partially activated. The incomplete activation of the initiator resulting from the absorption by the photoabsorbing compound is believed to prevent curing and/or results in a non-uniform or anisotropic cure that causes material defects and stresses to form within the lens. These defects negatively impact the mechanical and optical properties of the resulting contact lens. The invention addresses these problems by providing a differential cure process, as further described below.

The invention may be used to provide hard or soft contact lenses made of any known lens material, or material suitable for manufacturing such lenses. Preferably, the lenses of the invention are soft contact lenses that may have water contents from about 0 to about 90 percent, or from about 20 and about 75% water. The contact lenses of the invention may have a water content of at least about 25%. The lenses of the invention may have other desirable properties, such as a tensile modulus of less than about 200 psi, or less than about 150 psi. The lenses may have oxygen permeabilities of greater than about $50 \times 10^{11}$ ($cm^2$/sec) (ml $O_2$/ml×mmHg), or greater than about $75 \times 10^{11}$ ($cm^2$/sec) (ml $O_2$/ml×mmHg). It should be understood that combinations of the foregoing properties are desirable, and the above referenced ranges may be combined in any combination.

The contact lenses of the invention may be conventional hydrogels. The contact lenses of the invention may be silicone hydrogels. The contact lenses may be made of hydrophilic monomers, silicone-containing components and mixtures thereof to form polymers such as siloxanes, hydrogels, silicone hydrogels, and combinations thereof. Material useful for forming the lenses of the invention may be made by reacting blends of macromers, monomers, polymers and combinations thereof along with additives such as polymerization initiators. Suitable materials include, without limitation, silicone hydrogels made from silicone macromers and hydrophilic monomers. A reactive mixture of different polymerizable monomers may also be used, resulting in the production of a co-polymer.

Reactive mixtures for making contact lenses are well known and the components of such mixtures are commercially available or may be readily prepared by those skilled in the art. Examples polymers suitable for forming contact lenses include but are not limited to etafilcon A, genfilcon A, lenefilcon A, polymacon, balafilcon, acquafilcon, comfilcon, galyfilcon, senofilcon, narafilcon and lotrafilcon. Contact lens formulations may include etafilcon, senofilcon, balafilcon, galyfilcon, lotrafilcon, comfilcon, filcon II 3, asmofilcon A, and silicone hydrogels, as prepared, for instance, in U.S. Pat. No. 5,998,498; U.S. patent application Ser. No. 09/532,943, a continuation-in-part of U.S. patent application Ser. No. 09/532,943, filed on Aug. 30, 2000, and U.S. Pat. Nos. 6,087,415, 6,087,415, 5,760,100, 5,776,999, 5,789,461, 5,849,811, 5,965,631, 7,553,880, WO2008/061992, US2010/048847. These patents are hereby incorporated by reference for the hydrogel compositions contained therein.

The reactive mixture of the invention may be a 2-hydroxyethyl methacrylate (HEMA) based hydrogel, such as etafilcon A. Etafilcon A, disclosed in U.S. Pat. Nos. 4,680,336 and 4,495,313 incorporated herein in their entireties by reference, generally is a formulation primarily of HEMA and methacrylic acid (MAA), as well as various other additives such as crosslinkers and visibility tints.

The reactive mixture of the invention may be a silicone hydrogel made from at least one hydrophilic monomer and at least one silicone-containing component. Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants.

Preferred reactive mixtures may be based on a hydrophilic monomer selected from N, N-dimethylacrylamide (DMA), HEMA, and mixtures thereof; a silicone-containing component selected from 2-hydroxy-3-[3-methyl-3,3-di(trimethylsiloxy)silylpropoxy]-propyl methacrylate (SiMAA), monomethacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof. For the hydrophilic monomer, mixtures of DMA and HEMA are preferred. For the silicone containing component, mixtures of SiMAA and mPDMS are preferred.

Preferred reactive mixtures may be based on a hydrophilic monomer comprising a mixture of DMA and HEMA; a silicone-containing component comprising a mixture of mono-(2-hydroxy-3-methacryloxypropyloxy)-propyl terminated mono-n-butyl terminated polydimethylsiloxanes (OH-mPDMS) having from 2 to 20 repeat units (preferably a mixture of 4 and 15 repeat units).

The reactive mixture used in the methods of the invention contains a photoinitiator. The photoinitiator may absorb (and be activated by) various wavelengths of light, for instant UV wavelengths and/or visible wavelengths. Preferably, the photoinitiator of the methods of the invention may absorb within the visible range (about 380 nm to about 780 nm) of the electromagnetic spectrum. Suitable visible light photoinitiators are known in the art and include, but are not limited to, aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light photoinitiator systems include Irgacure 819, Irgacure 1700, Irgacure 1800, Irgacure 819, Irgacure 1850 (all from Ciba Specialty Chemicals) and Lucirin TPO initiator (available from BASF). These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator may be used in the reactive mixture in effective amounts to initiate photopolymerization of the reactive mixture, e.g., from about 0.1 to about 2 parts by weight per 100 parts of reactive monomer(s).

Particularly preferred visible light photoinitiators include alpha-hydroxy ketones such as Irgacure® (e.g. Irgacure 1700 or 1800) available from CIBA; various organic phosphine oxides, 2,2'-azo-bis-isobutyro-nitrile; diethoxyacetophenone; 1-hydroxycyclohexyl phenyl ketone; 2,2-dimethoxy-2-phenylacetophenone; phenothiazine; diisopropylxanthogen disulfide; benzoin or benzoin derivatives; and the like. Preferably, the photoinitiator is activated at wavelengths including ranges from 200 to 600 nm, or from 300 to 500 nm, or from 350 to 450 nm, or from 380 to 450 nm, or from 400 to 450 nm, or from 430 to 440 nm.

The photoabsorbing compound present in the reactive mixture is generally a compound that absorbs at least some of the activating radiation. For example, such compounds may absorb UV and or visible light in wavelengths that at least partially overlap with the wavelengths of the activating radiation that are needed to initiate the photoinitiator. The photoabsorbing compound may be a static photoabsorbing compound, meaning that its absorption profile does not significantly change upon exposure to radiation. Static photoabsorbing compounds are used, for instance, in non-photochromic sunglasses. Examples include compounds that absorb UV and/or HEV light (e.g., blue light).

The photoabsorbing compound may be a photochromic dye. A photochromic dye is any compound that is capable of transforming between a first "clear," "bleached" or "unactivated" ground state and a second "colored", "darkened" or "activated" state in response to the absorption of certain wavelengths of electromagnetic radiation (or "actinic radiation"). In one embodiment, the photochromic dye, when in an activated state, absorbs within the visible range (380 nm to 780 nm) of the electromagnetic spectrum. Examples of suitable photochromic dyes are known in the art and include, without limitation, the following classes of materials: chromenes, such as naphthopyrans, benzopyrans, indenon-aphthopyrans and phenanthropyrans; spiropyrans, such as spiro (benzindoline) naphthopyrans, spiro (indoline) benzopyrans, spiro (indoline) naphthopyrans, spiro (indoline) quinopyrans and spiro (indoline) pyrans; oxazines, such as spiro (indoline) naphthoxazines, spiro (indoline) pyridobenzoxazines, spiro (benzindoline) pyridobenzoxazines, spiro (benzindoline) naphthoxazines and spiro (indoline) benzoxazines; mercury dithizonates, fulgides, fulgimides and mixtures of such photochromic compounds.

Additional suitable photochromic dyes include, without limitation, organo-metal dithiozonates, such as (arylazo)-thioformic arylhydrazidates, e.g., mercury dithizonates; and fulgides and fulgimides, naphthoxazines, spirobenzopyrans; polymerizable spirobenzopyrans and spirobenzopyrans; polymerizable fulgides; polymerizable naphthacenediones; polymerizable spirooxazines; and polymerizable polyalkoxylated napthopyrans. The photochromic dyes may be used alone or in combination with one or more other photochromic dyes or static photoabsorbing compound.

Other suitable photochromic compounds are disclosed in U.S. Pat. No. 7,556,750, the disclosure of which is incorporated by reference. Non-limiting examples of suitable photochromic dyes include naphthopyrans such as those shown in Table 1. The dyes may include polymerizable functional groups such that they are copolymerized into the resulting contact lens. Examples of polymerizable functional groups include (meth)acrylates, (meth)acrylamides, vinyls and the like. In one embodiment, a photochromic dye is selected such that, when in an activated state, it absorbs across the visible spectrum but, when unactivated, absorbs below about 430 nm and less than about 10% across the visible spectrum.

Still other useful photochromic dyes include indeno-fused naphthopyrans chosen from an indeno[2',3':3,4]naphtho[1,2-b]pyran and an indeno[1',2':4,3]naphtho[2,1-b]pyran, which are more specifically disclosed in US2009/0072206 and US2006/0226401 and those cited in U.S. Pat. No. 7,364,291, and combinations thereof. A preferred photochromic dye is 4-[4-[3,13-dihydro-6-methoxy-13,13-dimethyl-3-phenyl-7-(1-piperidinyl)benzo[3,4]fluoreno[2,1-b]pyran-3-yl]phenyl]-γ-oxo-, 2-[(2-methyl-1-oxo-2-propen-1-yl)oxy]ethyl ester 1-piperazinebutanoic acid (reg. no. 1339922-40-5) shown below in Formula 1.

Formula 1

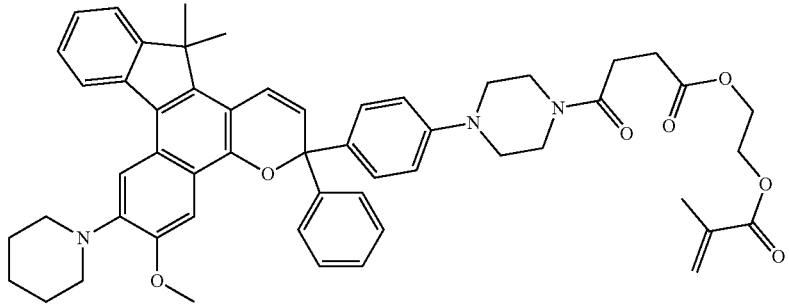

The contact lens may contain a mixture of photoabsorbing compounds, for instance at least one photochromic compound in mixture with other static photoabsorbing compounds, including pigments, dyes and UV and/or HEV absorbing compounds. Preferred UV and/or HEV absorbing compounds include compounds of formula 2:

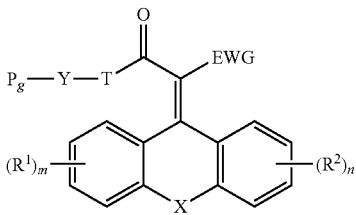

Formula 2 wherein:
  m and n are independently 0, 1, 2, 3, or 4;
  T is a bond, O, or NR;
  X is O, S, NR, SO, or $SO_2$;
  Y is a linking group;
  $P_g$ is a polymerizable group;
  R at each occurrence is independently H, $C_1$-$C_6$ alkyl, cycloalkyl, heterocycloalkyl, aryl, heteroaryl, or Y—$P_g$;
  $R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring; and
  EWG is an electron withdrawing group.

Preferred compounds of formula 2 include those wherein Y at each occurrence is independently alkylene, cycloalkylene, heterocycloalkylene, arylene, heteroarylene, oxaalkylene, alkylene-amide-alkylene, alkylene-amine-alkylene, or combinations thereof.

Preferred compounds of formula 2 include those wherein $P_g$ comprises styryl, vinyl carbonate, vinyl ether, vinyl carbamate, N-vinyl lactam, N-vinylamide, (meth)acrylate, or (meth)acrylamide.

Preferred compounds of formula 2 include those wherein X is O.

Preferred compounds of formula 2 include those wherein X is S.

Preferred compounds of formula 2 include those wherein EWG is cyano, amide, ester, keto, or aldehyde. More preferably, EWG is cyano.

Preferred compounds of formula 2 include those wherein m and n are each zero.

Preferred compounds of formula 2 include the following, including mixtures of two or more thereof:
2-(2-cyano-2-(9H-thioxanthen-9-ylidene)acetamido)ethyl methacrylate;
2-(2-cyano-2-(9H-thioxanthen-9-ylidene)acetamido)ethyl acrylate;
N-(2-(2-cyano-2-(9H-thioxanthen-9-ylidene)acetamido)ethyl)methacrylamide;
N-(2-(2-cyano-2-(9H-thioxanthen-9-ylidene)acetamido)ethyl)acrylamide;
2-(2-cyano-N-methyl-2-(9H-thioxanthen-9-ylidene)acetamido)ethyl methacrylate;
2-cyano-2-(9H-thioxanthen-9-ylidene)-N-(2-(N-vinylacetamido)ethyl)acetamide;
2-(2-cyano-2-(9H-xanthen-9-ylidene)acetamido)ethyl methacrylate;
2-(2-cyano-2-(9H-xanthen-9-ylidene)acetamido)ethyl acrylate;
N-(2-(2-cyano-2-(9H-xanthen-9-ylidene)acetamido)ethyl)methacrylamide;
N-(2-(2-cyano-2-(9H-xanthen-9-ylidene)acetamido)ethyl)acrylamide;
2-(2-cyano-N-methyl-2-(9H-xanthen-9-ylidene)acetamido)ethyl methacrylate;
2-cyano-N-(2-(N-vinylacetamido)ethyl)-2-(9H-xanthen-9-ylidene)acetamide;
2-(2-(acridin-9(10H)-ylidene)-2-cyanoacetamido)ethyl acrylate;
N-(2-(2-(acridin-9(10H)-ylidene)-2-cyanoacetamido)ethyl)methacrylamide;
N-(2-(2-(acridin-9(10H)-ylidene)-2-cyanoacetamido)ethyl)acrylamide;
2-(2-(acridin-9(10H)-ylidene)-2-cyano-N-methylacetamido)ethyl methacrylate;
2-(acridin-9(10H)-ylidene)-2-cyano-N-(2-(N-vinylacetamido)ethyl)acetamide;
2-(2-cyano-2-(9H-thioxanthen-9-ylidene)acetamido)-2-methylpropyl methacrylate;
2-(2-cyano-2-(9H-xanthen-9-ylidene)acetoxy)-2-methylpropyl acrylate;
(Z)-2-(2-cyano-2-(3-hydroxyacridin-9(10H)-ylidene)acetamido)ethyl methacrylate;
2-(2-cyano-2-(10-methylacridin-9(10H)-ylidene)acetamido)ethyl methacrylate;
2-(2-cyano-2-(3,6-dihydroxyacridin-9(10H)-ylidene)acetamido)ethyl methacrylate;
(E)-2-(2-(7H-benzo[c]xanthen-7-ylidene)-2-cyanoacetamido)ethyl methacrylate;
(Z)-2-(2-cyano-2-(3-methoxy-9H-xanthen-9-ylidene)acetamido)ethyl methacrylate;
2-(2-cyano-2-(3,6-dihydroxy-9H-xanthen-9-ylidene)acetamido)ethyl methacrylate;
(E)-2-(2-cyano-2-(2-methyl-9H-xanthen-9-ylidene)acetamido)ethyl methacrylate;
(E)-2-(2-cyano-2-(1-hydroxy-9H-xanthen-9-ylidene)acetamido)ethyl methacrylate;
(E)-2-(2-cyano-2-(2,4-dichloro-9H-thioxanthen-9-ylidene)acetamido)ethyl methacrylate;
(E)-2-(2-(2-chloro-9H-thioxanthen-9-ylidene)-2-cyanoacetamido)ethyl methacrylate;
(E)-2-(2-cyano-2-(2-isopropyl-9H-thioxanthen-9-ylidene)acetamido)ethyl methacrylate;
(E)-2-(2-cyano-2-(4-isopropyl-9H-thioxanthen-9-ylidene)acetamido)ethyl methacrylate;
2-(3-oxo-2-(9H-thioxanthen-9-ylidene)propanamido)ethyl methacrylate;
2-(3-oxo-2-(9H-thioxanthen-9-ylidene)butanamido)ethyl methacrylate;
2-(3-methoxy-3-oxo-2-(9H-thioxanthen-9-ylidene)propanamido)ethyl methacrylate;
2-(3-amino-3-oxo-2-(9H-thioxanthen-9-ylidene)propanamido)ethyl methacrylate;
2-(2-cyano-2-(10,10-dioxido-9H-thioxanthen-9-ylidene)acetamido)ethyl methacrylate;
N-(2-(2-cyano-2-(10-methylacridin-9(10H)ylidene)acetamido)ethyl) methacrylamide; or
2-(2-cyano-2-(9H-thioxanthen-9-ylidene)acetoxy)ethyl methacrylate.

The amount of photoabsorbing compound used will be the amount that is effective to achieve the desired reduction in percent transmission at the specific wavelengths where the selected photoabsorbing compound is active. By way of example, amounts may range from 0.05 to 10 percent, or from 0.1 to 5 percent, or from 0.1 to 3 percent, by weight based on the total weight of the reactive mixture (excluding diluents). In some embodiments, the amount is from 0.75 to 1.25 percent, by weight based on the total weight of the reactive mixture (excluding diluents)

The reactive mixture may contain various other additives, which may be reactive or non-reactive. Examples of such additives include, but are not limited to, crosslinkers, wetting agents, release agents, polymers, dyes, other light absorbing compounds such as UV absorbers, pigments, pharmaceutical compounds, nutraceutical compounds, diluents, or combinations of any of the foregoing.

According to the invention, reactive mixtures such as described above, are formed into contact lenses by dispensing the mixture into a mold assembly and subsequently curing the mixture. The mold assembly is comprised of a base curve, which is the mold half that contacts the posterior surface of the lens, and a front curve, which contacts the anterior surface. The front curve and base curve, when brought together, define and enclose a cavity between them which, according to the invention, contains the reactive mixture.

The mold components (front curve and base curve), from the which the mold assembly used in the invention is comprised, may be made from various materials, including disposable or reusable materials. For instance, the mold may be a thermoplastic optical mold, made from any suitable material including, without limitation, polyethylene, polypropylene, other polyolefins including homopolymers, copolymers, and terpolymers, polystyrene, polystyrene copolymers, polyesters such as poly(ethylene terephathalate) and poly(butylene terephthalate), polyamides, poly(vinyl alcohol) and its derivatives, hydrogenated styrene butadiene block copolymers like Tuftec, cyclic olefin polymers such as Zeonor and Topas resins, and combinations thereof. The mold may be selected to be transparent or mostly transparent to wavelengths that will activate the photoinitiator, thus permitting irradiation through the front and base curves. The material may be the same or difference between the front and base curves. A preferred material for the front curve of the mold assembly is a 90:10 (w/w) blend of cyclic olefin polymer and hydrogenated styrene butadiene block copolymer, respectively. A preferred material for the base curve of the mold assembly is a 90:10 (w/w) blend of cyclic olefin polymer and polypropylene. Other exemplary materials include a blend of Zeonor and Tuftec for either or both of the base curve and the front curve. The thickness of the base curve or front curve molds may vary, but is typically between 100 and 1500 microns, preferably between 600 and 800 microns, as measured in the center of the optical zone of the target lens mold design.

Sources of activating radiation for initiating the photoinitiators include, for instance, lamps that transmit light at the appropriate wavelengths for such initiation. A preferred source of activating radiation is a light emitting diode (LED) lamp. Preferred are LED lamps that transmit at the desired intensity and at a range of wavelengths that include from 200 to 600 nm, more preferably from 300 to 500 nm, most preferably from 350 to 450 nm.

The curing step is carried out by exposing the reactive mixture to radiation that includes the activating wavelength (the wavelength required to activate the photoinitiator). In the invention, the radiation is directed at both the base curve and the front curve of the mold assembly. In addition, the radiation has an radiant energy at the base curve that is greater than the radiation's radiant energy at the front curve.

The differential in radiant energy may be provided by using higher intensity radiation at the base curve than at the front curve. Radiation intensity may be measured by various instruments. For instance, as demonstrated in the examples a preferred instrument is ILT-2400, obtained from International Light Technologies.

The intensity of the radiation may generally be in the range of from 0.1 to 25 mW/cm$^2$, preferably from 1 to 15 mW/cm$^2$. As noted, the intensity of the radiation at the base curve may be greater than its intensity at the front curve. The radiation may have an intensity at the base curve that is at least 1 percent, alternatively at least 5 percent, alternatively at least 10 percent, alternatively at least 15 percent, or alternatively at least 20 percent, greater than the radiation's intensity at the front curve. The radiation may have an intensity at the base curve that is less than 350 percent, alternatively up to 300 percent, alternatively up to 250 percent, alternatively up to 200 percent, alternatively up to 150 percent, alternatively up to 100 percent, alternatively up to 90 percent, alternatively up to 80 percent, alternatively up to 70 percent, alternatively up to 60 percent, alternatively up to 50 percent, alternatively up to 45 percent, alternatively up to 40 percent, alternatively up to 35 percent, or alternatively up to 30 percent greater than the intensity at the front curve. For example, the radiation may have an intensity at the base that is greater than the radiation's intensity at the front curve by at least 1 percent and less than 350 percent, alternatively from 1 to 300 percent, alternatively from 1 to 250 percent, alternatively from 1 to 250 percent alternatively from 1 to 200 percent, alternatively from 1 to 150 percent, alternatively from 1 to 100 percent, alternatively from 5 to 300 percent alternatively from 5 to 250 percent, alternatively from 5 to 200 percent, alternatively from 5 to 150 percent, alternatively from 5 to 100 percent, alternatively from 10 to 300 percent, alternatively from 10 to 200 percent, alternatively from 10 to 150 percent, alternatively from 10 to 100 percent, alternatively from 20 to 300 percent, alternatively from 20 to 250 percent, alternatively from 20 to 200 percent, alternatively from 20 to 150 percent, or alternatively from 20 to 100 percent. By way of further example, the radiation may have an intensity at the base that is greater than the radiation's intensity at the front curve by at least 5 percent and up to 100 percent, alternatively from 5 to 80 percent, alternatively from 10 to 66.7 percent. As illustration, if the intensity at the base curve is 10 percent greater than at the front curve, then if the intensity at the base curve is about 3.3 mW/cm$^2$, the radiation's intensity at the front curve would be about 3.0 mW/cm$^2$. For further illustration, if the intensity at the base curve is 66.7 percent greater than at the front curve, then if the intensity at the base curve is about 4.17 mW/cm$^2$, the radiation's intensity at the front curve would be about 2.5 mW/cm$^2$.

When the radiation's intensity is used to provide the differential in radiant energy at the top and base curves, it is preferable that the wavelength at the top and base curves be the same. For instance, the wavelength may range from 350 nm to 450 nm, or from 380 nm to 450 nm, or from 400 nm to 450 nm, or from 430 nm to 440 nm.

The differential in radiant energy in the method of the invention may be provided by using different wavelengths of radiation at the base curve and the front curve. More specifically, the wavelength at the base curve may be shorter than the wavelength at the front curve. For example, the wavelength at the base curve may be at least 5 nm, or at least 10 nm, or at least 20 nm shorter than the wavelength at the front curve. Both wavelengths are capable of activating the photoinitiator. Both wavelengths may have the same intensity.

The differential in radiant energy in the method of the invention may be provided by using both different wavelengths and intensities of radiation at the base curve and the front curve. For example, the differential may be provided by using shorter wavelength and higher intensity radiation at the base curve than at the front curve.

As discussed above, there are several advantages to using a process where the radiant energy of the activating radiation at the base curve is greater than at the front curve. For instance, the inventive process provides contact lenses, containing a photoabsorbing compound, whose optical parameters have improved in comparison to single sided cure or non-differential double sided cure and whose lens properties are less dependent on cure conditions such as time, temperature, and irradiation intensity.

There are several ways in which to create the radiant energy differential across the mold assembly. One method is to use two separate light sources having different intensities, wavelengths, or both intensity and wavelength. Another method is to use a single light source directed to the base curve with a series of mirrors or reflective pallet features to redirect and/or reflect a portion of the irradiation light, now having a reduced intensity, towards the front curve.

After curing, the lens may be subjected to extraction to remove unreacted components and release the lens from the lens mold. The extraction may be done using conventional extraction fluids, such as organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble compounds such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

Lenses prepared as described above may exhibit the following quality properties. The lens may have a root mean squared optical path wavefront deviation from lens design target with spherical and cylindrical power as well as coma removed as measured using a 6.5 millimeter aperture that has been reduced as compared to an otherwise identical lens made under conditions of equal radiant energy at the base and front curves. The lens may have a root mean squared optical path wavefront deviation from lens design target with spherical and cylindrical power as well as coma removed as measured using a 6.5 millimeter aperture that has been reduced by at least 3% as compared to an otherwise identical lens made under conditions of equal radiant energy at the base and front curves. The lens may have a root mean squared optical path wavefront deviation from lens design target with spherical and cylindrical power as well as coma removed as measured using a 6.5 millimeter aperture that has been reduced by at least 0.0020 microns as compared to an otherwise identical lens made under conditions of equal radiant energy at the base and front curves.

The following clauses list non-limiting embodiments of the disclosure:

1. A method for manufacturing a photoabsorbing contact lens, the method comprising:
   (a) providing a mold assembly comprised of a base curve and a front curve, the base curve and the front curve defining and enclosing a cavity therebetween, the cavity containing a reactive mixture, wherein the reactive mixture comprises at least one polymerizable monomer, a photoinitiator which absorbs at an activating wavelength, and a photoabsorbing compound which displays absorption at the activating wavelength; and
   (b) curing the reactive mixture to form the photoabsorbing contact lens by exposing the reactive mixture to radiation that includes the activating wavelength, wherein the radiation is directed at both the base curve and the front curve of the mold assembly, and wherein the radiation has an intensity at the base curve that is greater than the radiation's intensity at the front curve.

2. The method of clause 1 wherein the radiation has an intensity at the base curve that is less than 350 percent greater than the radiation's intensity at the front curve.

3. The method of any one of clauses 1 to 2 wherein the radiation has an intensity at the base curve that is from 1 percent to less than 350 percent greater than the radiation's intensity at the front curve.

4. The method of any one of clauses 1 to 3 wherein the radiation is provided by a first light source that is proximate to the base curve of the mold assembly and a second light source that is proximate to the front curve of the mold assembly.

5. The method of clause 4 wherein the first light source is a light emitting diode and the second light source is a light emitting diode.

6. The method of any one of clauses 1 to 5 wherein the photoabsorbing compound is a static photoabsorbing compound.

7. The method of any one of clauses 1 to 6 wherein the photoabsorbing compound is a high energy visible light absorber.

8. The method of any one of clauses 1 to 5 wherein the photoabsorbing compound is a photochromic compound.

9. The method of any one of clauses 1 to 8 wherein the base curve and front curves of the mold assembly are comprised of polyethylene, polypropylene, polystyrene, hydrogenated styrene butadiene block copolymers, cyclic olefin polymers, and combinations thereof.

10. The method of any one of clauses 1 to 9 wherein the wavelength of the radiation at the base curve is the same as the radiation's wavelength at the front curve.

11. The method of any one of clauses 1 to 10 wherein the wavelength of the radiation at the base curve and at the front curve is from 350 to 450 nm.

12. The method of any one of clauses 1 to 11 wherein the wavelength of the radiation at the base curve and at the front curve is from 400 to 450 nm.

13. A method for manufacturing a photoabsorbing contact lens, the method comprising:

(a) providing a mold assembly comprised of a base curve and a front curve, the base curve and the front curve defining and enclosing a cavity therebetween, the cavity containing a reactive mixture, wherein the reactive mixture comprises at least one polymerizable monomer, a photoinitiator which absorbs at an activating wavelength, and a photoabsorbing compound which displays absorption at the activating wavelength; and (b) curing the reactive mixture to form the photoabsorbing contact lens by exposing the reactive mixture to radiation that includes the activating wavelength, wherein the radiation is directed at both the base curve and the front curve of the mold assembly, and wherein the radiation has wavelength at the base curve that is shorter than the radiation's wavelength at the front curve.

14. The method of any one of 13 wherein the wavelength at the base curve is at least about 10 nanometers shorter than the wavelength at the front curve.

15. The method of any one of clauses 13 to 14 wherein the radiation is provided by a first light source that is proximate to the base curve of the mold assembly and a second light source that is proximate to the front curve of the mold assembly.

16. The method of clause 15 wherein the first light source is a light emitting diode and the second light source is a light emitting diode.

17. The method of any one of clauses 13 to 16 wherein the photoabsorbing compound is a static photoabsorbing compound.

18. The method of any one of clauses 13 to 17 wherein the photoabsorbing compound is a high energy visible light absorber.

19. The method of any one of clauses 13 to 18 wherein the photoabsorbing compound is a photochromic compound.

20. The method of any one of clauses 13 to 19 wherein the base curve and front curves of the mold assembly are comprised of polyethylene, polypropylene, polystyrene, hydrogenated styrene butadiene block copolymers, cyclic olefin polymers, and combinations thereof.

21. The method of any one of clauses 13 to 20 wherein the intensity of the radiation at the base curve is the same as the radiation's intensity at the front curve.

22. The method of any one of clauses 13 to 21 wherein the wavelength of the radiation at the base curve and at the front curve is from 350 to 450 nm.

23. The method of any one of clauses 13 to 22 wherein the wavelength of the radiation at the base curve and at the front curve is from 400 to 450 nm.

24. A photoabsorbing contact lens prepared by the method of any one of clauses 1 to 12.

25. The method of any one of clauses 1 to 12 or the photoabsorbing contact lens of clause 24, the lens having a root mean squared optical path wavefront deviation from lens design target with spherical and cylindrical power as well as coma removed as measured using a 6.5 millimeter aperture that has been reduced as compared to an otherwise identical lens made under conditions of equal radiant energy at the base and front curves.

26. The method or contact lens of clause 25 wherein the root mean squared optical path wavefront deviation from lens design target with spherical and cylindrical power as well as coma removed as measured using a 6.5 millimeter aperture has been reduced by at least 3% as compared to an otherwise identical lens made under conditions of equal radiant energy at the base and front curves.

27. The method or contact lens of clause 25 wherein the root mean squared optical path wavefront deviation from lens design target with spherical and cylindrical power as well as coma removed as measured using a 6.5 millimeter aperture has been reduced by at least 0.0020 microns as compared to an otherwise identical lens made under conditions of equal radiant energy at the base and front curves.

28. A photoabsorbing contact lens prepared by the method of any one of clauses 13 to 23.

29. The method of any one of clauses 13 to 23 or the photoabsorbing contact lens of clause 28, having a root mean squared optical path wavefront deviation from lens design target with spherical and cylindrical power as well as coma removed as measured using a 6.5 millimeter aperture has been reduced as compared to an otherwise identical lens made under conditions of equal radiant energy at the base and front curves.

30. The method or contact lens of clause 29 wherein the root mean squared optical path wavefront deviation from lens design target with spherical and cylindrical power as well as coma removed as measured using a 6.5 millimeter aperture has been reduced by at least 3% as compared to an otherwise identical lens made under conditions of equal radiant energy at the base and front curves.

31. The method or contact lens of clause 29 wherein the root mean squared optical path wavefront deviation from lens design target with spherical and cylindrical power as well as coma removed as measured using a 6.5 millimeter aperture has been reduced by at least 0.0020 microns as compared to an otherwise identical lens made under conditions of equal radiant energy at the base and front curves.

Some embodiments of the invention will now be described in detail in the following Examples.

EXAMPLES

A calibrated dual interferometric method was used for measuring contact lens parameters in packing solution. These parameters included equivalent sphere power at multiple apertures (diopters or D), cylinder power at multiple apertures (diopters or D), diameter (millimeters or mm), center thickness (millimeters or mm), sagittal height (millimeters or mm), and root mean squared (RMS) optical path wavefront deviation from lens design target in micrometers or microns (μm) with sphere/cylinder power and coma removed as measured using a 6.5 millimeter aperture. The instrument consists of a custom, propitiatory interferometer for the measurement of wavefront parameters and a Lumetrics OptiGauge® II low-coherence interferometer for the measurement of the dimensional parameters of sagittal height and center thickness. The two individual instruments combined are similar to Lumetrics Clearwave™ Plus, and the software is similar to Lumetrics OptiGauge Control Center v7.0 or higher. With the Clearwave™ Plus, a camera is used to find the lens edge, and then the lens center is calculated, which is then used to align a 1310 nanometer interferometer probe at the lens center for the measurement of sagittal height and center thickness. The transmitted wavefront is also collected in series using a wavefront sensor (shack-Hartmann sensor). Multiple parameters from the transmitted wavefront of the contact lens are measured, and others are calculated from those measurements.

From the data collected, difference terms are calculated by comparing the measured values from the target. These include root mean squared optical path wave front deviation from lens design target in μm (sphere/cylinder power and coma deviation removed) as measured using a 6.5 millimeter aperture (RMS_65), the second equivalent sphere power deviation from lens design target in diopters (D) as measured using a 5 millimeter aperture (PW2EQD), deviation from lens design target diameter in mm (DMD), deviation from lens design target base curve radius as calculated from the measured sagittal height and target lens diameter according to ISO 18369-3 in mm (BCD), and deviation from lens design target center thickness in mm (CTD). RMS_65, DMD, and BCD were used to develop a manufacturing process for a photoabsorbing contact lens.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

The following abbreviations will be used throughout the Examples and have the following meanings:

PP: polypropylene which is the homopolymer of propylene

TT: Tuftec which is a hydrogenated styrene butadiene block copolymer (Asahi Kasei Chemicals)

Z: Zeonor which is a polycycloolefin thermoplastic polymer (Nippon Zeon Co Ltd)

DMA: N, N-dimethylacrylamide (Jarchem)

HEMA: 2-hydroxyethyl methacrylate (Bimax)

mPDMS: mono-n-butyl terminated monomethacryloxy-propyl terminated polydimethylsiloxane ($M_n$=600-1500 daltons) (Gelest)

SiMAA: 2-propenoic acid, 2-methyl-2-hydroxy-3-[3-[1, 3,3,3-tetramethyl-1-[(trimethylsilyl)oxy]disiloxanyl] propoxy]propyl ester or 3-(3-(1,1,1,3,5,5,5-heptamethyl-trisiloxan-3-yl)propoxy)-2-hydroxypropyl methacrylate (Toray)

Norbloc: 2-(2'-hydroxy-5-methacrylyloxyethylphenyl)-2H-benzotriazole (Janssen)

Blue HEMA: 1-amino-4-[3-(4-(2-methacryloyloxy-ethoxy)-6-chlorotriazin-2-ylamino)-4-sulfophenylamino] anthraquinone-2-sulfonic acid, as described in U.S. Pat. No. 5,944,853

Formula 1: 4-[4-[3,13-dihydro-6-methoxy-13,13-dimethyl-3-phenyl-7-(1-piperidinyl) benzo[3,4]fluoreno[2,1-b] pyran-3-yl]phenyl]-γ-oxo-, 2-[(2-methyl-1-oxo-2-propen-1-yl)oxy] ethyl ester 1-piperazinebutanoic acid.

PVP K90: poly(N-vinylpyrrolidone) (ISP Ashland)

Irgacure 1870: blend of bis(2,6-dimethoxybenzoyl)-2,4, 4-trimethyl-pentylphosphineoxide and 1-hydroxy-cyclo-hexyl-phenyl-ketone (BASF or Ciba Specialty Chemicals)

D3O: 3,7-dimethyl-3-octanol (Vigon)

LED: light emitting diode

Packing or Packaging Solution Recipe: 18.52 grams (300 millimoles) of boric acid, 3.7 grams (9.7 millimoles) of sodium borate decahydrate, and 28 grams (197 millimoles) of sodium sulfate were dissolved in enough deionized water to fill a 2-liter volumetric flask.

Examples 1-36

Contact lenses were prepared on a pilot line consisting of a two-zone cure tunnel in which irradiation may occur from the top and from the bottom of the tunnel (see FIG. 2). A pallet containing eight mold assemblies travels down the tunnel. The first zone used 435 nm LED lamps having an intensity of about 1.5 mW/cm$^2$ as measured on the pallet supporting the mold assemblies. The second zone used the same lamps but having an intensity between about 5 and about 10 mW/cm$^2$ again as measured on the pallet supporting the mold assemblies. The temperature was held constant in both zones at 65° C. The atmosphere was also held constant in both zones using nitrogen. The proportion of total cure time spent in the low intensity, first zone was fixed at 62.5% of the total cure time. The intensity ratio ($I_t/I_b$) was varied in the two-zone cure tunnel, wherein $I_t$ is defined as the light intensity on the top side or the base curve side of the mold assembly as measured on the pallet, and $I_b$ is defined as the light intensity on the bottom side or the front curve side of the mold assembly as measured on the pallet. When $I_t$ and $I_b$ are of equal intensities, the intensity ratio is equal to one (1). When $I_t$ is higher than $I_b$, the intensity ratio is greater than one (>1). When $I_t$ is lower than $I_b$, the intensity ratio is less than one (<1). Intensity ratios greater than one represent experimental conditions wherein the radiant energy at the base curve is greater than the radiant energy at the front curve. For a given intensity ratio, the average intensity ($0.5*I_t+0.5*I_b$) in the first zone was held constant at about 1.5 mW/cm$^2$. For a given intensity ratio, the average higher intensity in the second zone was varied between about 5 and about 10 mW/cm$^2$.

The curing light sources used were LED panels with adjustable intensity and fixed emission wavelength, fabricated by Lumos Solutions Ltd. The wavelength specification for each panel was equal to target wavelength ±1 nm. For each experimental setting, panel light intensities were set using a NIST traceable radiometer model ILT2400 equipped with an XRD340A sensor, both of which were purchased from and calibrated by International Light Technologies Inc. During experimental setup, the radiometer sensor was positioned using a holder that places the radiometer sensor at the height of the top of the lens mold for upward facing measurements (top intensity) and the bottom of the lens mold for downward facing measurements (bottom intensity).

Reactive monomer mixtures (Lots 1 and 2) were prepared by combining a mixture of components as listed in Table 1 and a diluent (D30). The mixture of reactive and nonreactive components represented 77 weight percent of the final reactive monomer mixture, while the diluent D30 represented 23 weight percent of the final reactive monomer mixture. The final reactive monomer was filtered through 3-micron filter paper under pressure and then degassed under vacuum (about 40 mm Hg). About 100 microliters of these reactive monomer mixtures were dispensed onto the front curve molds in a pallet. Subsequently, base curve molds were placed on top of the front curve molds and mechanically secured. The front curve molds were made by injection molding and were composed of 90:10 (w/w) Zeonor and Tuftec blend; the base curve molds were also injection molded and were composed of 90:10 (w/w) Zeonor and Tuftec blend. Molds are typically injection molded and used almost immediately. Molds may also be injection molded, stored, and then equilibrated in a nitrogen gas environment having a low fixed amount of oxygen gas for at least twelve hours prior to use. In the following examples, the molds used were not calibrated for any of the cure conditions and were designed to form minus 12 diopter spherical contact lenses. The cure conditions for examples 1-36 are listed in Table 2.

The cured lenses were mechanically de-molded with most lenses adhering to the front curve molds and released by submerging the lenses in propylene glycol for about two or four hours, followed by washing two times with deionized water for at least 90 minutes in totality, and equilibrating with borate buffered packing solution. A person of ordinary skill recognizes that the exact lens release process can be varied depending on the lens formulation, mold materials, and release solvent/solution. The purpose of the lens release process is to release all lenses without defects and transition from diluent swollen networks to the packing solution swollen hydrogels. The hydrated lenses were transferred into primary packages and subsequently sterilized by autoclaving at 122° C. for 18 minutes. Following sterilization, the contact lenses were allowed to equilibrate for at least 14 days prior to optical characterization.

For each example, RMS_65, DMD, and BCD were measured. The RMS_65 data is shown in FIG. 3; the DMD data is shown in FIG. 4, and the BCD data is shown in FIG. 5. The means of RMS_65, DMD, and BCD are listed in Table 3.

As shown in FIG. 3, the downward trend in RMS_65 with increasing intensity ratio indicated that the optical quality of the lenses was improving. As shown in FIGS. 4-5, the sensitivity of DMD and BCD to total cure time variation was significantly reduced when the intensity ratio was greater than one as compared to intensity ratios of one or less than one, thereby enabling a more robust processing window. These results were unexpected because the design of the pallet already reduced the amount of light from the bottom LED lamps reaching the mold assemblies. Using an intensity ratio greater than one further increases this light gradient applied to the mold assemblies.

TABLE 1

Formulations

| Components | Lot 1 Weight Percent | Lot 2 Weight Percent |
|---|---|---|
| mPDMS | 28-33 | 28-33 |
| SiMAA | 27-20 | 27-20 |
| DMA | 22-24 | 22-24 |
| HEMA | 4-6 | 4-6 |
| Formula 1 | 1 | 1 |
| PVP K90 | 5-7 | 5-7 |
| TEGDMA | 1-3 | 1-3 |
| Norbloc | 1-3 | 1-3 |
| Blue Hema | 0.01-0.05 | 0.01-0.05 |
| Irgacure 1870 | 0.4-1 | 0.4-1 |

The final reactive monomer mixture was a solution composed of 77 weight percent of the component mixture listed above and 23 weight percent diluent D3O.

TABLE 2

Cure Conditions

| Example | Lot # | Total Cure Time (minutes) | Average High Intensity (mW/cm$^2$) | Intensity Ratio ($I_t/I_b$) |
|---|---|---|---|---|
| 1 | 1 | 7 | 5 | 0.74 |
| 2 | 1 | 8 | 5 | 0.74 |
| 3 | 1 | 9 | 5 | 0.74 |
| 4 | 1 | 14 | 5 | 0.74 |
| 5 | 1 | 7 | 7.5 | 0.74 |
| 6 | 1 | 8 | 7.5 | 0.74 |
| 7 | 1 | 9 | 7.5 | 0.74 |
| 8 | 1 | 14 | 7.5 | 0.74 |
| 9 | 1 | 7 | 10 | 0.74 |
| 10 | 1 | 8 | 10 | 0.74 |
| 11 | 1 | 9 | 10 | 0.74 |
| 12 | 1 | 14 | 10 | 0.74 |
| 13 | 2 | 7 | 5 | 1 |
| 14 | 2 | 8 | 5 | 1 |
| 15 | 2 | 9 | 5 | 1 |
| 16 | 2 | 14 | 5 | 1 |
| 17 | 1 | 7 | 7.5 | 1 |
| 18 | 1 | 8 | 7.5 | 1 |
| 19 | 1 | 9 | 7.5 | 1 |
| 20 | 1 | 14 | 7.5 | 1 |
| 21 | 2 | 7 | 10 | 1 |
| 22 | 2 | 8 | 10 | 1 |
| 23 | 2 | 9 | 10 | 1 |
| 24 | 2 | 14 | 10 | 1 |
| 25 | 2 | 7 | 5 | 1.35 |
| 26 | 2 | 8 | 5 | 1.35 |
| 27 | 2 | 9 | 5 | 1.35 |
| 28 | 2 | 14 | 5 | 1.35 |
| 29 | 2 | 7 | 7.5 | 1.35 |
| 30 | 2 | 8 | 7.5 | 1.35 |
| 31 | 2 | 9 | 7.5 | 1.35 |
| 32 | 2 | 14 | 7.5 | 1.35 |
| 33 | 2 | 7 | 10 | 1.35 |
| 34 | 2 | 8 | 10 | 1.35 |
| 35 | 2 | 9 | 10 | 1.35 |
| 36 | 2 | 14 | 10 | 1.35 |

TABLE 3

Lens Characterization

| Example | RMS_65 Mean (microns) | DMD Mean (mm) | BCD Mean (mm) |
|---|---|---|---|
| 1 | 0.08609 | −0.20932 | −0.15662 |
| 2 | 0.08603 | −0.16693 | −0.13931 |
| 3 | 0.09576 | −0.11995 | −0.08216 |
| 4 | 0.07939 | −0.08141 | −0.05266 |
| 5 | 0.09451 | −0.14541 | −0.10590 |
| 6 | 0.07964 | −0.12276 | −0.09434 |
| 7 | 0.08469 | −0.11635 | −0.09975 |
| 8 | 0.07835 | −0.09451 | −0.06643 |
| 9 | 0.10143 | −0.14747 | −0.11366 |
| 10 | 0.09043 | −0.13073 | −0.12291 |
| 11 | 0.09389 | −0.12569 | −0.10998 |
| 12 | 0.10343 | −0.08961 | −0.07183 |
| 13 | 0.07419 | −0.18405 | −0.14932 |
| 14 | 0.08203 | −0.16673 | −0.14027 |
| 15 | 0.07448 | −0.14105 | −0.09269 |
| 16 | 0.07200 | −0.10887 | −0.07483 |
| 17 | 0.09361 | −0.12683 | −0.11434 |
| 18 | 0.09399 | −0.11643 | −0.09625 |
| 19 | 0.08724 | −0.09091 | −0.08337 |
| 20 | 0.09923 | −0.08379 | −0.06951 |
| 21 | 0.06324 | −0.16454 | −0.12155 |
| 22 | 0.08823 | −0.14869 | −0.12444 |
| 23 | 0.05689 | −0.08725 | −0.07181 |
| 24 | 0.06464 | −0.10979 | −0.07767 |
| 25 | 0.07053 | −0.14393 | −0.09808 |
| 26 | 0.07600 | −0.15124 | −0.11368 |
| 27 | 0.07393 | −0.13637 | −0.10856 |
| 28 | 0.07733 | −0.10853 | −0.08354 |
| 29 | 0.07309 | −0.11408 | −0.09385 |
| 30 | 0.07175 | −0.09919 | −0.06666 |
| 31 | 0.07785 | −0.10215 | −0.09174 |
| 32 | 0.07515 | −0.10127 | −0.06730 |
| 33 | 0.07532 | −0.11471 | −0.07753 |
| 34 | 0.07387 | −0.12184 | −0.08151 |
| 35 | 0.06687 | −0.09455 | −0.04895 |
| 36 | 0.07617 | −0.09821 | −0.06933 |

Examples 37-72

Contact lenses were made using another batch of the same formulation listed in Table 1 and by the same experimental protocol as described for examples 1-36 except that (1) the proportion of total cure time spent in the low intensity, first zone was fixed at 50% of the total cure time, (2) the intensities in zones 1 and 2 were varied as shown in Table 4, and (3) following sterilization, the contact lenses were allowed to equilibrate for at least 14 days prior to optical characterization. Optical characterization, namely wavefront measurements and RMS_65 Mean calculations, was based on a sample size of fifteen lenses per experimental condition.

The curing light sources used were LED panels with adjustable intensity and fixed emission wavelength, fabricated by Lumos Solutions Ltd. The wavelength specification for each panel was equal to target wavelength ±1 nm. For each experimental setting, panel light intensities were set using a NIST traceable radiometer model ILT2400 equipped with an XRD340A sensor, both of which were purchased from and calibrated by International Light Technologies Inc. During experimental setup, the radiometer sensor was positioned using a holder that places the radiometer sensor at the height of the top of the lens mold for upward facing measurements (top intensity) and the bottom of the lens mold for downward facing measurements (bottom intensity).

As shown in Table 4 and FIG. 6, the downward trend in RMS_65 with increasing intensity ratio indicated that the optical quality of the lenses was improving.

Examples 73-96

Contact lenses were made using another batch of the same formulation listed in Table 1 and by the same experimental protocol as described for examples 1-36 except that (1) the proportion of total cure time spent in the low intensity, first zone was fixed at 50% of the total cure time, (2) the top and bottom intensities were equal ($I_t/I_b=1$) within each of the two intensity zones as shown in Table 5, and (3) the peak emission wavelengths of the top and bottom LED panels varied as listed in Table 5. Optical characterization, namely wavefront measurements and RMS_65 Mean calculations, was based on a sample size of fifteen lenses per experimental condition.

The wavelength ratio ($\lambda_t/\lambda_b$) was varied across the two-zone cure tunnel, wherein $\lambda_t$ is defined as the peak emission wavelength of the top side LED light panels or the base curve side of the mold assembly, and $\lambda_b$ is defined as the peak emission wavelength of the bottom side LED light panels or the front curve side of the mold assembly. When $\lambda_t$ and $\lambda_b$ are equal, the wavelength ratio is equal to one (1). When $\lambda_t$ is longer than $\lambda_b$, the wavelength ratio is greater than one (>1). When $\lambda_t$ is shorter than $\lambda_b$, the wavelength ratio is less than one (<1). Wavelength ratios less than one represent experimental conditions wherein the radiant energy at the base curve is greater than the radiant energy at the front curve.

TABLE 4

Cure Conditions and RMS_65 Data

| Example | Total Cure Time (minutes) | Top and Bottom Panel Wavelength (nm) | Zone 1 Top Panel Intensity (mW/cm²) | Zone 1 Bottom Panel Intensity (mW/cm²) | Zone 2 Top Panel Intensity (mW/cm²) | Zone 2 Bottom Panel Intensity (mW/cm²) | Intensity Ratio ($I_t/I_b$) | RMS_65 Mean (microns) |
|---|---|---|---|---|---|---|---|---|
| 37 | 5 | 435 | 0.98 | 1.63 | 3.17 | 5.28 | 0.6 | 0.12569 |
| 38 | 7 | 435 | 0.98 | 1.63 | 3.17 | 5.28 | 0.6 | 0.12637 |
| 39 | 10 | 435 | 0.98 | 1.63 | 3.17 | 5.28 | 0.6 | 0.12259 |
| 40 | 14 | 435 | 0.98 | 1.63 | 3.17 | 5.28 | 0.6 | 0.12477 |
| 41 | 5 | 435 | 1.5 | 2.5 | 4.88 | 8.13 | 0.6 | 0.12839 |
| 42 | 7 | 435 | 1.5 | 2.5 | 4.88 | 8.13 | 0.6 | 0.12969 |
| 43 | 10 | 435 | 1.5 | 2.5 | 4.88 | 8.13 | 0.6 | 0.13397 |
| 44 | 14 | 435 | 1.5 | 2.5 | 4.88 | 8.13 | 0.6 | 0.12491 |
| 45 | 5 | 435 | 2.03 | 3.38 | 6.58 | 10.97 | 0.6 | 0.13575 |
| 46 | 7 | 435 | 2.03 | 3.38 | 6.58 | 10.97 | 0.6 | 0.13193 |
| 47 | 10 | 435 | 2.03 | 3.38 | 6.58 | 10.97 | 0.6 | 0.13619 |
| 48 | 14 | 435 | 2.03 | 3.38 | 6.58 | 10.97 | 0.6 | 0.10839 |
| 49 | 5 | 435 | 1.3 | 1.3 | 4.23 | 4.23 | 1 | 0.11723 |
| 50 | 7 | 435 | 1.3 | 1.3 | 4.23 | 4.23 | 1 | 0.11601 |
| 51 | 10 | 435 | 1.3 | 1.3 | 4.23 | 4.23 | 1 | 0.10725 |
| 52 | 14 | 435 | 1.3 | 1.3 | 4.23 | 4.23 | 1 | 0.11965 |
| 53 | 5 | 435 | 2 | 2 | 6.5 | 6.5 | 1 | 0.11493 |
| 54 | 7 | 435 | 2 | 2 | 6.5 | 6.5 | 1 | 0.12124 |
| 55 | 10 | 435 | 2 | 2 | 6.5 | 6.5 | 1 | 0.12092 |
| 56 | 14 | 435 | 2 | 2 | 6.5 | 6.5 | 1 | 0.12478 |
| 57 | 5 | 435 | 2.7 | 2.7 | 8.78 | 8.78 | 1 | 0.11679 |
| 58 | 7 | 435 | 2.7 | 2.7 | 8.78 | 8.78 | 1 | 0.11215 |
| 59 | 10 | 435 | 2.7 | 2.7 | 8.78 | 8.78 | 1 | 0.11467 |
| 60 | 14 | 435 | 2.7 | 2.7 | 8.78 | 8.78 | 1 | 0.12124 |
| 61 | 5 | 435 | 1.63 | 0.98 | 5.28 | 3.17 | 1.67 | 0.11449 |
| 62 | 7 | 435 | 1.63 | 0.98 | 5.28 | 3.17 | 1.67 | 0.10985 |
| 63 | 10 | 435 | 1.63 | 0.98 | 5.28 | 3.17 | 1.67 | 0.09609 |
| 64 | 14 | 435 | 1.63 | 0.98 | 5.28 | 3.17 | 1.67 | 0.09862 |
| 65 | 5 | 435 | 2.5 | 1.5 | 8.13 | 4.88 | 1.67 | 0.09456 |
| 66 | 7 | 435 | 2.5 | 1.5 | 8.13 | 4.88 | 1.67 | 0.11961 |
| 67 | 10 | 435 | 2.5 | 1.5 | 8.13 | 4.88 | 1.67 | 0.10532 |
| 68 | 14 | 435 | 2.5 | 1.5 | 8.13 | 4.88 | 1.67 | 0.10075 |
| 69 | 5 | 435 | 3.38 | 2.03 | 10.97 | 6.58 | 1.67 | 0.09467 |
| 70 | 7 | 435 | 3.38 | 2.03 | 10.97 | 6.58 | 1.67 | 0.11237 |
| 71 | 10 | 435 | 3.38 | 2.03 | 10.97 | 6.58 | 1.67 | 0.08638 |
| 72 | 14 | 435 | 3.38 | 2.03 | 10.97 | 6.58 | 1.67 | 0.10271 |

The curing light sources used were LED panels with adjustable intensity and fixed emission wavelength, fabricated by Lumos Solutions Ltd. The wavelength specification for each panel was equal to target wavelength ±1 nm. For each experimental setting, panel light intensities were set using a NIST traceable radiometer model ILT2400 equipped with an XRD340A sensor, both of which were purchased from and calibrated by International Light Technologies Inc. During experimental setup, the radiometer sensor was positioned using a holder that places the radiometer sensor at the height of the top of the lens mold for upward facing measurements (top intensity) and the bottom of the lens mold for downward facing measurements (bottom intensity).

As shown in Table 6 and FIG. 7, when the wavelength ratio was less that one, the RMS_65 Mean values were substantially smaller than the RMS_65 Mean values when the wavelength ration was greater than one, indicating that the optical quality of the lenses was improved.

TABLE 5

Cure Conditions

| Example | Total Cure Time (minutes) | Top Panel Wavelength (nm) | Bottom Panel Wavelength (nm) | Zone 1 Top Panel Intensity (mW/cm$^2$) | Zone 1 Bottom Panel Intensity (mW/cm$^2$) | Zone 2 Top Panel Intensity (mW/cm$^2$) | Zone 2 Bottom Panel Intensity (mW/cm$^2$) |
|---|---|---|---|---|---|---|---|
| 49 | 5 | 435 | 435 | 1.3 | 1.3 | 4.23 | 4.23 |
| 50 | 7 | 435 | 435 | 1.3 | 1.3 | 4.23 | 4.23 |
| 51 | 10 | 435 | 435 | 1.3 | 1.3 | 4.23 | 4.23 |
| 52 | 14 | 435 | 435 | 1.3 | 1.3 | 4.23 | 4.23 |
| 53 | 5 | 435 | 435 | 2 | 2 | 6.5 | 6.5 |
| 54 | 7 | 435 | 435 | 2 | 2 | 6.5 | 6.5 |
| 55 | 10 | 435 | 435 | 2 | 2 | 6.5 | 6.5 |
| 56 | 14 | 435 | 435 | 2 | 2 | 6.5 | 6.5 |
| 57 | 5 | 435 | 435 | 2.7 | 2.7 | 8.78 | 8.78 |
| 58 | 7 | 435 | 435 | 2.7 | 2.7 | 8.78 | 8.78 |
| 59 | 10 | 435 | 435 | 2.7 | 2.7 | 8.78 | 8.78 |
| 60 | 14 | 435 | 435 | 2.7 | 2.7 | 8.78 | 8.78 |
| 73 | 5 | 440 | 430 | 1.3 | 1.3 | 4.23 | 4.23 |
| 74 | 7 | 440 | 430 | 1.3 | 1.3 | 4.23 | 4.23 |
| 75 | 10 | 440 | 430 | 1.3 | 1.3 | 4.23 | 4.23 |
| 76 | 14 | 440 | 430 | 1.3 | 1.3 | 4.23 | 4.23 |
| 77 | 5 | 440 | 430 | 2 | 2 | 6.5 | 6.5 |
| 78 | 7 | 440 | 430 | 2 | 2 | 6.5 | 6.5 |
| 79 | 10 | 440 | 430 | 2 | 2 | 6.5 | 6.5 |
| 80 | 14 | 440 | 430 | 2 | 2 | 6.5 | 6.5 |
| 81 | 5 | 440 | 430 | 2.7 | 2.7 | 8.78 | 8.78 |
| 82 | 7 | 440 | 430 | 2.7 | 2.7 | 8.78 | 8.78 |
| 83 | 10 | 440 | 430 | 2.7 | 2.7 | 8.78 | 8.78 |
| 84 | 14 | 440 | 430 | 2.7 | 2.7 | 8.78 | 8.78 |
| 85 | 5 | 430 | 440 | 1.3 | 1.3 | 4.23 | 4.23 |
| 86 | 7 | 430 | 440 | 1.3 | 1.3 | 4.23 | 4.23 |
| 87 | 10 | 430 | 440 | 1.3 | 1.3 | 4.23 | 4.23 |
| 88 | 14 | 430 | 440 | 1.3 | 1.3 | 4.23 | 4.23 |
| 89 | 5 | 430 | 440 | 2 | 2 | 6.5 | 6.5 |
| 90 | 7 | 430 | 440 | 2 | 2 | 6.5 | 6.5 |
| 91 | 10 | 430 | 440 | 2 | 2 | 6.5 | 6.5 |
| 92 | 14 | 430 | 440 | 2 | 2 | 6.5 | 6.5 |
| 93 | 5 | 430 | 440 | 2.7 | 2.7 | 8.78 | 8.78 |
| 94 | 7 | 430 | 440 | 2.7 | 2.7 | 8.78 | 8.78 |
| 95 | 10 | 430 | 440 | 2.7 | 2.7 | 8.78 | 8.78 |
| 96 | 14 | 430 | 440 | 2.7 | 2.7 | 8.78 | 8.78 |

TABLE 6

RMS_65 Data

| Example | Total Cure Time (minutes) | Top Panel Wavelength (nm) | Bottom Panel Wavelength (nm) | Wavelength Ratio ($\lambda_t/\lambda_b$) | RMS_65 Mean (microns) |
|---|---|---|---|---|---|
| 49 | 5 | 435 | 435 | 1 | 0.11723 |
| 50 | 7 | 435 | 435 | 1 | 0.11601 |
| 51 | 10 | 435 | 435 | 1 | 0.10725 |
| 52 | 14 | 435 | 435 | 1 | 0.11965 |
| 53 | 5 | 435 | 435 | 1 | 0.11493 |
| 54 | 7 | 435 | 435 | 1 | 0.12124 |
| 55 | 10 | 435 | 435 | 1 | 0.12092 |
| 56 | 14 | 435 | 435 | 1 | 0.12478 |
| 57 | 5 | 435 | 435 | 1 | 0.11679 |
| 58 | 7 | 435 | 435 | 1 | 0.11215 |
| 59 | 10 | 435 | 435 | 1 | 0.11467 |

TABLE 6-continued

RMS_65 Data

| Example | Total Cure Time (minutes) | Top Panel Wavelength (nm) | Bottom Panel Wavelength (nm) | Wavelength Ratio ($\lambda_t/\lambda_b$) | RMS_65 Mean (microns) |
|---|---|---|---|---|---|
| 60 | 14 | 435 | 435 | 1 | 0.12124 |
| 73 | 5 | 440 | 430 | 1.0232 | 0.15201 |
| 74 | 7 | 440 | 430 | 1.0232 | 0.16482 |
| 75 | 10 | 440 | 430 | 1.0232 | 0.16333 |
| 76 | 14 | 440 | 430 | 1.0232 | 0.16107 |
| 77 | 5 | 440 | 430 | 1.0232 | 0.14089 |
| 78 | 7 | 440 | 430 | 1.0232 | 0.15414 |
| 79 | 10 | 440 | 430 | 1.0232 | 0.16120 |
| 80 | 14 | 440 | 430 | 1.0232 | 0.15851 |
| 81 | 5 | 440 | 430 | 1.0232 | 0.17095 |
| 82 | 7 | 440 | 430 | 1.0232 | 0.17252 |
| 83 | 10 | 440 | 430 | 1.0232 | 0.16215 |
| 84 | 14 | 440 | 430 | 1.0232 | 0.15364 |
| 85 | 5 | 430 | 440 | 0.9773 | 0.08553 |
| 86 | 7 | 430 | 440 | 0.9773 | 0.08979 |
| 87 | 10 | 430 | 440 | 0.9773 | 0.08196 |
| 88 | 14 | 430 | 440 | 0.9773 | 0.08395 |
| 89 | 5 | 430 | 440 | 0.9773 | 0.08396 |
| 90 | 7 | 430 | 440 | 0.9773 | 0.08901 |
| 91 | 10 | 430 | 440 | 0.9773 | 0.08423 |
| 92 | 14 | 430 | 440 | 0.9773 | 0.08322 |
| 93 | 5 | 430 | 440 | 0.9773 | 0.08696 |
| 94 | 7 | 430 | 440 | 0.9773 | 0.08395 |
| 95 | 10 | 430 | 440 | 0.9773 | 0.08151 |
| 96 | 14 | 430 | 440 | 0.9773 | 0.08687 |

We claim:

1. A method for manufacturing a photoabsorbing contact lens, the method comprising:
    (a) providing a mold assembly comprised of a base curve and a front curve, the base curve and the front curve defining and enclosing a cavity therebetween, the cavity containing a reactive mixture, wherein the reactive mixture comprises at least one polymerizable monomer, a photoinitiator which absorbs at an activating wavelength, and a photoabsorbing compound which displays absorption at the activating wavelength; and
    (b) curing the reactive mixture to form the photoabsorbing contact lens by exposing the reactive mixture to radiation that includes the activating wavelength, wherein the radiation is directed at both the base curve and the front curve of the mold assembly, and wherein the radiation has an intensity at the base curve that is less than 350 percent greater than the radiation's intensity at the front curve.

2. The method of claim 1 wherein the radiation has an intensity at the base curve that is from 1 percent to less than 350 percent greater than the radiation's intensity at the front curve.

3. The method of claim 1 wherein the radiation is provided by a first light source that is proximate to the base curve of the mold assembly and a second light source that is proximate to the front curve of the mold assembly.

4. The method of claim 3 wherein the first light source is a light emitting diode and the second light source is a light emitting diode.

5. The method of claim 1 wherein the photoabsorbing compound is a static photoabsorbing compound.

6. The method of claim 1 wherein the photoabsorbing compound is a high energy visible light absorber.

7. The method of claim 1 wherein the photoabsorbing compound is a photochromic compound.

8. The method of claim 1 wherein the base curve and front curve of the mold assembly are comprised of at least one or polyethylene, polypropylene, polystyrene, hydrogenated styrene butadiene block copolymers, cyclic olefin polymers, or combinations thereof.

* * * * *